US008560402B2

(12) United States Patent  
Tarbell et al.

(10) Patent No.: US 8,560,402 B2  
(45) Date of Patent: Oct. 15, 2013

(54) SYSTEM AND METHOD OF SHOPPING BY COLOR

(75) Inventors: Jared Tarbell, Albuquerque, NM (US); Robert Kalin, Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 1213 days.

(21) Appl. No.: 11/834,175

(22) Filed: Aug. 6, 2007

(65) Prior Publication Data  
US 2008/0154747 A1 Jun. 26, 2008

Related U.S. Application Data

(60) Provisional application No. 60/837,411, filed on Aug. 11, 2006.

(51) Int. Cl.  
*G06Q 30/00* (2012.01)

(52) U.S. Cl.  
USPC ..... 705/27.1; 705/26.1; 705/26.63; 705/27.2; 386/241; 386/286; 725/60

(58) Field of Classification Search  
USPC ....................................................... 705/27.1  
See application file for complete search history.

(56) References Cited

U.S. PATENT DOCUMENTS

| | | | | |
|---|---|---|---|---|
| 5,150,307 A | * | 9/1992 | McCourt et al. | 700/223 |
| 5,949,904 A | * | 9/1999 | Delp | 382/165 |
| 6,026,411 A | * | 2/2000 | Delp | 707/700 |
| 7,046,842 B2 | * | 5/2006 | Lin et al. | 382/165 |
| 7,961,938 B1 | * | 6/2011 | Remedios | 382/162 |
| 2003/0083982 A1 | | 5/2003 | Fisher et al. | |
| 2009/0281925 A1 | * | 11/2009 | Winter et al. | 705/27 |

FOREIGN PATENT DOCUMENTS

| | | | |
|---|---|---|---|
| EP | 1276057 A2 | * | 1/2003 |
| KR | 1020010106868 A | | 12/2001 |
| KR | 1020020015222 A | | 2/2002 |

* cited by examiner

*Primary Examiner* — Bradley B. Bayat  
(74) *Attorney, Agent, or Firm* — Lando & Anastasi, LLP

(57) ABSTRACT

System and method for shopping for products based on color of the product, time of product listing, and/or location of the seller of the product. Seller submits a representation of the product to be listed with an Internet-based shopping site that may include an image of the product. The site may determine one or more color of the product based on a submitted image by examining image pixels. The pixels examined may be chosen to accurately reflect the color of the product rather than the color of an image background or other image element. The color may include a set of the significant colors of the product or a single most significant or average color of the product. Shoppers may then search for products based on a color selected from a color search interface, a time selected from a time search interface, and/or a location selected from a location search interface.

46 Claims, 14 Drawing Sheets

Colors

Display Results

| | | | | | |
|---|---|---|---|---|---|
| 1301A ☐ | Vessel by Fondule | 7.8.2006 | t | 60 | $12.00 |
| 1301B ☐ | Vessel by Fondule | 7.8.2006 | t | 60 | $12.00 |
| 1301C ☐ | Vessel by Fondule | 7.8.2006 | t | 60 | $12.00 |
| 1301D ☐ | Vessel by Fondule | 7.8.2006 | t | 60 | $12.00 |
| 1301E ☐ | Vessel by Fondule | 7.8.2006 | t | 60 | $12.00 |
| 1301F ☐ | Vessel by Fondule | 7.8.2006 | t | 60 | $12.00 |
| 1301G ☐ | Vessel by Fondule | 7.8.2006 | t | 60 | $12.00 |
| 1301H ☐ | Vessel by Fondule | 7.8.2006 | t | 60 | $12.00 |
| 1301I ☐ | Vessel by Fondule | 7.8.2006 | t | 60 | $12.00 |
| 1301J ☐ | Vessel by Fondule | 7.8.2006 | t | 60 | $12.00 |

SYSTEM AND METHOD OF SHOPPING BY COLOR

RELATED APPLICATION

This application claims priority under 35 U.S.C. §119(e) to U.S. Provisional Application No. 60/837,411, entitled "SYSTEM AND METHOD FOR SHOPPING BY COLOR," filed Aug. 11, 2006, which is hereby incorporated by reference in its entirety for all purposes.

BACKGROUND

1. Field of Invention

The present invention relates to Internet-based shopping and more particularly to shopping based on a product color or colors, a product listing time, and/or a product seller's location.

2. Discussion of Related Art

Internet-based shopping has grown into a major industry. Typical Internet-based shopping sites present a shopper with a wide variety of products when the shopper visits a shopping webpage. Within an interface associated with a typical Internet-based shopping site, the shopper (e.g., a user) chooses the products he or she wants to purchase and proceeds to pay for those products. Those products are then shipped to an address provided by the shopper.

Some Internet-based shopping sites are linked to a specific manufacturer or type of product and allow users to choose from only a limited array of products from that manufacturer or that type. Others are more general sites that allow users to select from a wide array of product types from a wide array of manufacturers. While some of these Internet-based shopping sites provide shoppers with a department store-like shopping experience where the sites present the shopper with the products of only large sellers or manufacturers, others provide shoppers with a more market-like shopping experience where the site presents the shopper with products from smaller or individual sellers or manufacturers. In any case, shoppers at Internet-based shopping sites are typically presented with a vast number of products of different types, colors, origins, etc. from which to choose.

When presented with such a vast number of products, effectively finding a desired product may be difficult. Typical Internet-based shopping sites provide shoppers with at least one search method designed to help shoppers find products among the numerous products offered for sale by the site.

One example of a search method offered by some Internet-based shopping sites is a keyword-based search method. In sites that offer such a search method, each product is associated with one or more keywords that are typically entered by the seller of the product when the product is listed with the site. Such search methods generally accept one or more keywords from a shopper and search through the products listed by the site for any products that are associated with the entered keyword(s). The search method then provides the shopper with a list of only those associated products.

Another example of a search method offered by some Internet-based shopping sites is a category-based search method. In sites that offer such search methods, each product is associated with one or more categories and, in some instances, subcategories. Shoppers using such search methods are generally presented with a list of categories from which to choose. Upon choosing a category, shoppers may be presented with the items associated with the chosen category and/or a list of subcategories associated with the category.

SUMMARY OF INVENTION

In accordance with one aspect of the present invention, it is realized that many shoppers may first want to see a product before purchasing the product. The aesthetics of a product, including color, texture, etc., may be, in some instances, a primary factor in the purchase of some products. For example, a shopper may be interested in the aesthetics of different types of products, including clothing, furniture, and paint. To address this issue, many Internet-based shopping sites provide images of each product that are viewable by shoppers before the shoppers decide to purchase any product. These images are typically provided by the product seller to the site when the product is first listed with the site. Such sites associate the images with the product and display them for shoppers interested in the product.

In accordance with one aspect of the present invention, it is realized that typical Internet-based shopping sites do not provide shoppers the ability to search products by their aesthetic characteristics. More particularly, it is appreciated that the functionality of an Internet-based shopping site may be enhanced by allowing shoppers to search through the products listed with the site by color.

To facilitate this search by color, for example, each product may be associated with one or more color values representing a color of the product. The color values may be determined, for example, by a seller, by a color-determining component of an Internet-based shopping site, or by any other entity. In one example system that permits users to search by color, an Internet-based shopping site may be provided with a representation of a desired color. To this end, some example Internet-based shopping site may include an interface having controls that permit a shopper to search products using the desired color value. For instance, some embodiments of an Internet-based shopping site may products listed for sale to find any products that are associated with color values matching the desired color.

According to one aspect of the present invention, a method for selling a product is provided. The method comprises acts of receiving at least one representation of the product, determining at least one color of the product based, at least in part, on the at least one representation, and associating the product with the at least one color.

In one embodiment of the present invention, the at least one representation of the product includes at least one image of the product. In another embodiment, the method includes determining the at least one color of the product based, at least in part, on at least one pixel of the at least one image. In another embodiment, the at least one color of the product is based, at least in part, on an average color of the at least one pixel. In another embodiment, the image includes at least one product portion that includes the at least one pixel and at least one background portion. In another embodiment, the at least one pixel includes a plurality of pixels. In another embodiment, the plurality of pixels are more concentrated in at least one focal portion of the image than in at least one secondary portion of the image. In yet another embodiment, the focal portion includes the center of the image and the secondary portion includes the periphery of the image.

In one embodiment of the present invention, the at least one color includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value. In another embodiment of the present invention, the at least one representation of the product includes at least one of a description of the product, a price of the product, an availability of the product, and an identification of a seller of the product. In another embodiment of the present invention, the at least one representation of the product includes an indication of the at least one color of the product. In another embodiment of the present invention, a user submits the at least one representation of the product through at least one submission interface.

In one embodiment of the present invention, the method further comprises an act of responding to a search request, which includes at least one representation of a desired color, by transmitting at least one representation of at least one second product that is associated with a matching color of the desired color. In one embodiment of the present invention, the matching color is within a color range of the desired color. In one embodiment of the present invention the search request includes an indication of the matching color range. In one embodiment of the present invention, a user submits the at least one search request through at least one search interface. In one embodiment of the present invention, the at least one search interface includes at least one color selector that includes a representation of a plurality of selectable colors. In one embodiment of the present invention, the selectable colors are arrange in a rectangle with hue represented along a first axis and brightness and saturation represented along a second axis such that one portion of the second axis represents a change in brightness and another portion of the second axis represents a change in saturation. In one embodiment of the present invention, the color selector includes at least one SWF file.

In one embodiment of the present invention, the search interface includes a web-based interface. In one embodiment of the present invention, the method further comprises an act of receiving at least one purchase request that includes at least one representation of the at least one second product. In one embodiment of the present invention, the user submits the at least search request and the at least one purchase request through at least one search interface.

In one embodiment of the present invention, the search request includes at least one additional search parameter and the method comprises responding to the search request by transmitting the at least one representation of the at least one second product that is associated with the matching color of the desired color and matches the at least one additional search parameter. In one embodiment of the present invention, the additional search parameter includes at least one of a product category, a product name, a keyword, a product price range, and a manufacturer name. In one embodiment of the present invention, the method in includes storing at least a portion of the at least one representation with at the at least one color in at least one database table.

In aspect of the present invention, a system for selling a product is provided. The system comprises a submission component configure to accept submission of at least one representation of the product and associate the product with at least one first color, and a color component configured to determine the at least one first color based, at least in part, on the at least one representation. In one embodiment of the present invention, the at least one representation of the product includes at least one image of the product. In one embodiment of the present invention, the color component is configured to determine the at least one first color of the product based, at least in part, on at least one pixel of the at least one image. In one embodiment of the present invention, the at least one first color of the product is based, at least in part, on an average color of the at least one pixel.

In one embodiment of the present invention, the image includes at least one product portion that includes the at least one pixel and at least one background portion. In one embodiment of the present invention, the at least one pixel includes a plurality of pixels. In one embodiment of the present invention, the plurality of pixels are more concentrated in at least one focal portion of the image than in at least one secondary portion of the image. In one embodiment of the present invention, the focal portion includes the center of the image and the secondary portion includes the periphery of the image.

In one embodiment of the present invention, the at least one first color includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value. In one embodiment of the present invention, the at least one representation of the product includes at least one of a description of the product, a price of the product, an availability of the product, and an identification of a seller of the product. In one embodiment of the present invention, the at least one representation of the product includes an indication of the at least one first color of the product. In one embodiment of the present invention, a user submits the at least one representation of the product to the submission component through at least one submission interface.

In one embodiment of the present invention, the system further comprises a search component configured to respond to a search request, which includes at least one representation of a desired color, by transmitting at least one representation of at least one second product that is associated with a matching color of the desired color. In one embodiment of the present invention, the matching color is within a color range of the desired color. In one embodiment of the present invention, the search request includes an indication of the matching color range. In one embodiment of the present invention, a user submits the at least one search request to the search component through at least one search interface. In one embodiment of the present invention, the at least one search interface includes at least one color selector that includes a representation of a plurality of selectable colors. In one embodiment of the present invention, the selectable colors are arrange in a rectangle with hue represented along a first axis and brightness and saturation represented along a second axis such that one portion of the second axis represents a change in brightness and another portion of the second axis represents a change in saturation. In one embodiment of the present invention, the color selector includes at least one SWF file.

In one embodiment of the present invention, the search interface includes a web-based interface. In one embodiment of the present invention, the search request includes at least one additional search parameter and the search component is configured to respond to the search request by transmitting the at least one representation of the at least one second product that is associated with the matching color of the desired color and matches the at least one additional search parameter. In one embodiment of the present invention, the additional search parameter includes at least one of a product category, a product name, a keyword, a product price range, and a manufacturer name. In one embodiment of the present invention, the system further comprises at least one storage component configured to store at least a portion of the at least one representation and the at least one first color in at least one database.

In one aspect of the present invention, a method of selling a plurality of products is provided. The method comprises acts of displaying an interface by which at least one user may select at least one desired color from a plurality of selectable colors, and responding to at least one request from the user, the request identifying the at least one desired color, by providing a representation of at least one first product of the plurality of products, wherein the at least one product is associated with at least one first color that matches the desired color.

In one embodiment of the present invention, the interface includes a web-based interface. In one embodiment of the present invention, the web-based interface includes at least one SWF to display the plurality of selectable colors. In one embodiment of the present invention, the plurality of selectable colors are arrange in the interface in a rectangle with hue represented along a first axis and brightness and saturation represented along a second axis such that one portion of the second axis represents a change in brightness and another portion of the second axis represents a change in saturation. In one embodiment of the present invention, the method includes displaying the representation through the interface in a location based, at least in part, on the at least one first color. In one embodiment of the present invention, the method further comprises an act of receiving at least one purchase request identifying the at least one first product.

In one embodiment of the present invention, the method further comprises an act of determining at least one second color for each product of the plurality of products. In one embodiment of the present invention, the method includes determining at least one second color based, at least in part, on an image associated with the respective product of the plurality of products. In one embodiment of the present invention, the at least one first color matches the desired color if the at least one first color is within a color range of the desired color. In one embodiment of the present invention, the request from the user includes at least one indication of the color range. In one embodiment of the present invention, the interface includes at least one color range selector.

In one embodiment of the present invention, each of the first color, the desired color, and the selectable colors includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value. In one embodiment of the present invention, the representation of the at least one first product includes at least one of an image of the product, a description of the product, a price of the product, an availability of the product, and an identification of a seller of the product.

In one embodiment of the present invention, the at least one request includes an indication of at least one additional search parameter and wherein the at least one first product matches the at least one additional search parameter. In one embodiment of the present invention, the additional search parameter includes at least one of a product category, a product name, a keyword, a product price range, and a manufacturer name. In one embodiment of the present invention, the interface includes at least one additional search parameter selector.

In one aspect of the present invention, a system for selling a plurality of products is provided. The system comprises a search component configured to provide a user with an interface through which the user may select at least one desired color from a plurality of selectable colors, and further configured to respond to a selection by the user of the desired color by displaying a representation of at least one first product of the plurality of products, wherein the at least one product is associated with at least one first color that matches the desired color.

In one embodiment of the present invention, the interface includes a web-based interface. In one embodiment of the present invention, the web-based interface includes at least one SWF to display the plurality of selectable colors. In one embodiment of the present invention, the plurality of selectable colors are arrange in the interface in a rectangle with hue represented along a first axis and brightness and saturation represented along a second axis such that one portion of the second axis represents a change in brightness and another portion of the second axis represents a change in saturation. In one embodiment of the present invention, the representation is displayed through the interface in a location based, at least in part, on the at least one first color.

In one embodiment of the present invention, the system further comprises a color component configured to determining at least one second color for each product of the plurality of products. In one embodiment of the present invention, the color component is further configured to determine at least one second color based, at least in part, on an image associated with the respective product of the plurality of products. In one embodiment of the present invention, the at least one first color matches the desired color if the at least one first color is within a color range of the desired color. In one embodiment of the present invention, the request from the user includes at least one indication of the color range.

In one embodiment of the present invention, the interface includes at least one color range selector. In one embodiment of the present invention, each of the first color, the desired color, and the selectable colors includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value. In one embodiment of the present invention, the representation of the at least one first product includes at least one of an image of the product, a description of the product, a price of the product, an availability of the product, and an identification of a seller of the product.

In one embodiment of the present invention, the at least one request includes an indication of at least one additional search parameter and wherein the at least one product also matches the at least one additional search parameter. In one embodiment of the present invention, the additional search parameter includes at least one of a product category, a product name, a keyword, a product price range, and a manufacturer name. In one embodiment of the present invention, the interface includes at least one additional search parameter selector.

In one aspect of the present invention, a method for selling a product is provided. The method comprises acts of receiving at least one first representation of the product, determining at least one first time associated with the act of receiving the at least one first representation, associating the product with the at least one first time, and responding to are least one search request identifying at least one first time range with at least one second representation of the product when the at least one first time range includes the at least one first time.

In one aspect of the present invention, a system for selling a product is provided. The system comprising a submission component configure to accept submission of at least one first representation of the product and configured to associate the product with at least one first time associated with the submission of the at least one representation of the product, and a search component configured to respond to at least one search request identifying at least one first time range with at least one second representation of the product when the at least one time range includes the at least one first time.

In one aspect of the present invention, a method for selling a product is provided. The method comprises acts of receiving at least one first representation of the product, including a first location of a seller of the product, associating the product with the first location and the seller, and responding to at least one search request identifying at least one geographic area with at least one of a second representation of the product and a representation of the seller when the at least one geographic area includes the first location.

In one aspect of the present invention, a system for selling a product is provided. The system comprises a submission component configured to accept submission of at least one first representation of the product, including a first location of a seller of the product, and associate the product with the first location and the seller, and a search component configured to respond to at least one search request identifying at least one first geographic area with at least one of a second representation of the product and a representation of the seller when the at least one geographic area includes the first location.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 13 shows an example interface that may be used to display products matching a desired color according to one embodiment of the present invention.

DETAILED DESCRIPTION

Figure 1:
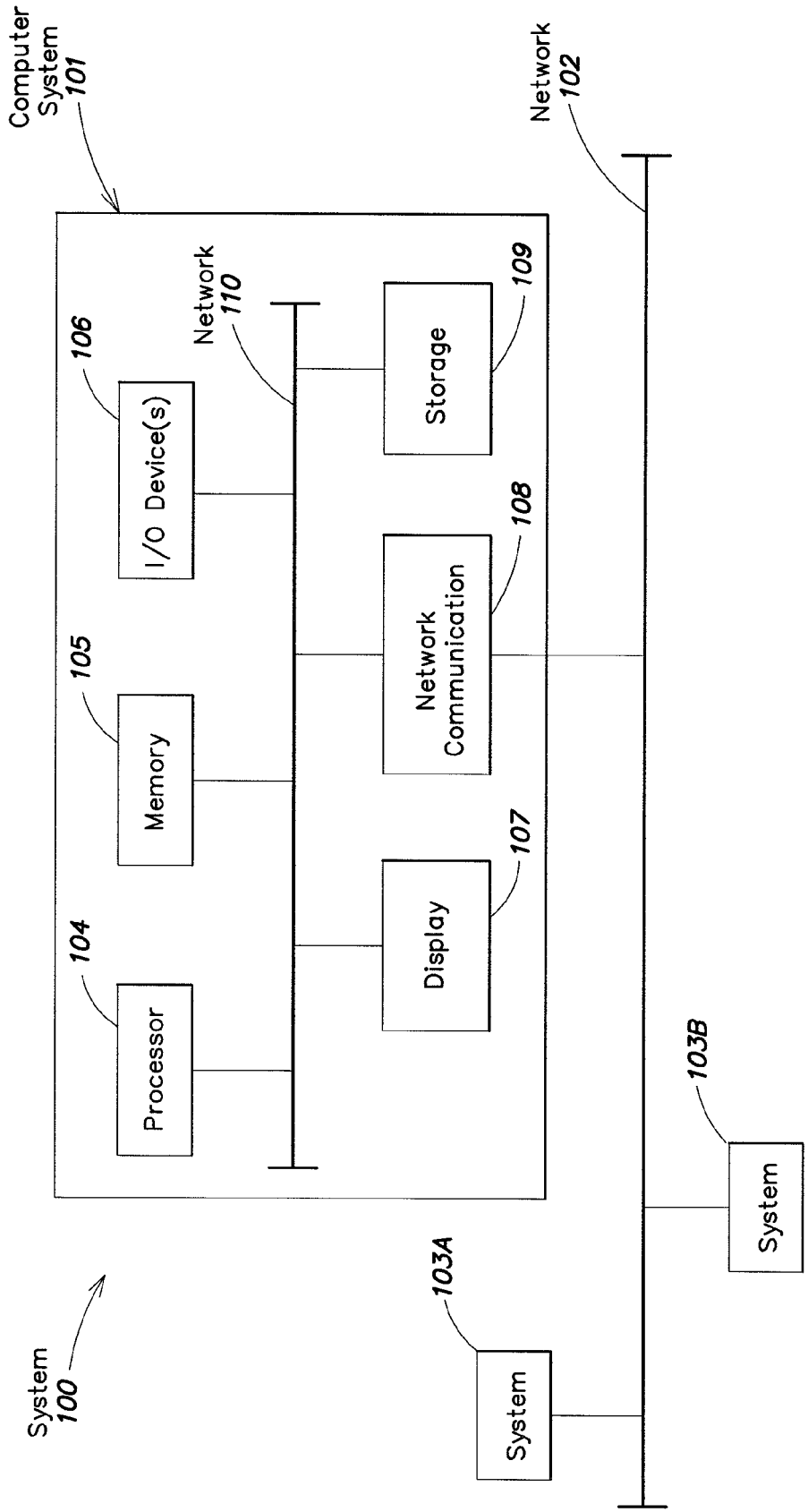
FIG. 1 shows an example computer system upon which various aspects of the present invention may be implemented.

This invention is not limited in its application to the details of construction and the arrangement of components and acts set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present invention relates generally to shopping by color through an Internet-based shopping site. By providing a shop-by-color tool to shoppers of an Internet-based shopping site, shoppers may be able to more effectively search through products listed with the site.

In one embodiment of the present invention, an Internet-based shopping site may associate each product listed with the site with one or more colors that are indicative of the colors of the product. One aspect of the present invention relates to generating at least one color for a product listed for sale with an Internet-based shopping site.

In another embodiment, one or more images may be associated with each product. In another embodiment, an Internet-based shopping site may determine the at least one color of the product based on at least one of the images. For instance, an Internet-based shopping site may examine one or more pixels of the images to determine the color. Each product may then be associated with the at least one respective color, for example, by storing other product information in a database with the at least one color. It should be appreciated that more than one color may be used to describe a particular product.

Shoppers, in one embodiment, may search for products listed with an Internet-based shopping site based on at least one color. In another embodiment, shoppers may use a search interface to select a desired color. In another embodiment, an Internet-based shopping site may be configured to search for products associated with a color that matches the desired color or is within a matching color range of the desired color. In one embodiment, shoppers may obtain product information for the products that are associated with such a matching color or a matching color range and purchase those products from an Internet-based shopping site.

When the term matching color is used herein, it should be understood to include any color considered to match the desired color by an embodiment of the present invention. One embodiment may limit a matching color to a color having an exactly equal color value. Another embodiment may include as a matching color any color in color range of the desired color. When the term matching color is used, it should be understood to include either embodiment or any other method of determining when one color matches another color.

A color may be described by one or more sets of color components. A set of color components may be used by an Internet-based shopping site to identify the color within a traditional color space (e.g., red, green, blue (RGB); cyan, magenta, yellow, key (CMYK); hue, saturation, brightness (HSV); hue, saturation, lightness (HSL)). In one embodiment one or more sets of color components used by an Internet-based shopping site may also identify the color to other standard devices configured to display or process color information, such as a computer display. In one embodiment, an Internet-based shopping site may define color values by one or more sets of color components that may include a RGB set, a CMYK set, and/or an HSV set.

When the term color value or a derivative thereof is used herein, the term color value should be understood to include one or more color components or other color identifiers. In one embodiment the one or more color components may include a set of color components that identifies the color within a traditional color space (i.e., a model identifying colors by color components, such as the RGM, CMYK, or HSV color spaces). In some implementations, multiple sets of color components may make up a color value, such as, for example, a HSV set and a RGB set. In some implementations, a color identifier may include a color name or a color ID number that identifies a color in a color list.

In one embodiment, an Internet-based shopping site may store color information and other information, which may include product-related and seller-related information, in one or more databases (e.g., object, relational, or other database type). Alternatively or in addition to traditional databases, color values and/or additional information may be stored in any other database format such as flat-file or other data structure file format (e.g., extensible markup language (XML)). Whenever updates or access to the information is needed, the system may reference or update the stored information as appropriate.

The system may be configured to display an interface to a shopper allowing the shopper to search for products by color. In one embodiment, the interface may be a graphical user interface (GUI) such as a website accessible with a standard web browser program as is known in the art. A similar GUI may be accessible to product sellers to allow sellers to list new products with an Internet-based shopping site.

General Purpose Computer System

Various aspects of the present invention may be implemented on one or more computer systems. These computer systems may include, for example, general-purpose computers such as those based on Intel PENTIUM-type processor; Motorola PowerPC; AMD Athlon, Turion or Opteron; Sun UltraSPARC; Hewlett-Packard PA-RISC processors; or any other type of processor. The system may be located on a single computer or may be distributed among multiple computers attached by a communication network.

A general-purpose computer system according to one embodiment of the invention may be configured to perform any of the described functions, including but not limited to, storing, editing, categorizing, and retrieving information. It should be appreciated that the system may perform other functions, including other acts of managing information, sharing information, formatting information, communicating with banks or credit card providers, etc., and the invention is not limited to having any particular function or set of functions.

FIG. 1 illustrates a block diagram of a general purpose computer and network system in which various aspects of the present invention may be practiced. For example, various aspects of the invention may be implemented as specialized software executing in one or more computer systems including general-purpose computer system 101 shown in FIG. 1. Computer system 101 may include a general-purpose computer system that is programmable using a high-level computer programming language. Computer system 101 may be also implemented using specially programmed, special purpose hardware. In computer system 101, one or more processors 104 are typically a commercially available processor such as the well-known Pentium class processor available from the Intel Corporation or the well-known Opteron class processor available from AMD Corporation. Many other processors are available. Such a processor usually executes an operating system which may include, for example, the Windows-based operating systems (e.g., Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Further, it should be appreciated that other appropriate programming languages and other appropriate computer systems could also be used.

Various embodiments of the present invention may be programmed using an object-oriented programming language, such as SmallTalk, Java, C++, Ada, Python, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a GUI or perform other functions). Various aspects of the invention may be implemented as programmed or non-programmed elements, or any combination thereof.

Computer system 101 may also include one or more memory devices 105, such as a disk drive, memory, or other device for storing data, connected to the processor 104. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of computer system 101.

Computer system 101 may also include one or more input/output (I/O) devices 106, for example, a keyboard, mouse, trackball, microphone, touch screen, a printing device, display screen, speaker, etc. In addition, computer system 101 may contain one or more interfaces (e.g., network communication device 108) that connect computer system 101 to a communication network (in addition or as an alternative to the network 110).

The computer system 101 may include one or more storage systems 109. The storage system 109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory 104, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components than that shown in FIG. 1.

Specifically, one or more portions of the computer system may be distributed across one or more computer systems coupled to the communications network such as computer systems 103A and 103B. These computer systems also may include general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Example System Architecture

Figure 2:
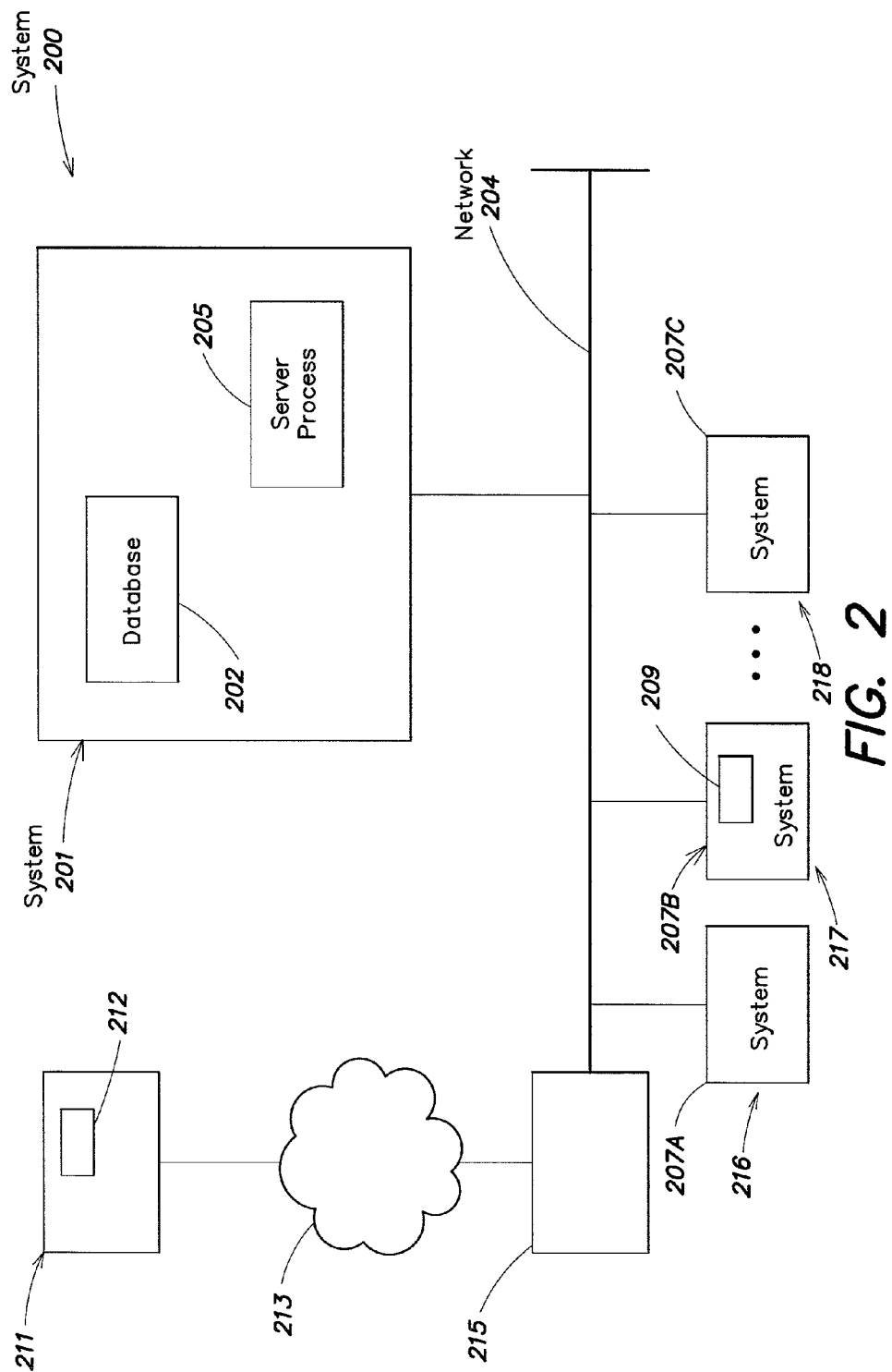
FIG. 2 shows an example system architecture according to one embodiment of the present invention.

FIG. 2 illustrates an architecture diagram of an example system according to one embodiment of the invention on which an Internet-based shopping site may be implemented. For example, a computer system (e.g., 201, 208A-D) may act as a web server responding to requests from users of an Internet-based shopping site. The web server may communicate with other computer systems (e.g., 201, 208A-D), such as database servers, to obtain information that may be needed to provide responses to the users. It should be appreciated that FIG. 2 is used for illustration purposes only, and that other architectures may be used to facilitate one or more aspects of the present invention.

As shown in FIG. 2, a distributed system 200 may be used to submit, maintain, and search color information. System 200 may include one or more computer systems (e.g., systems 201, 208A-D) coupled by a communication network 204. Such computer systems may include, for example, general-purpose computer systems as discussed above with reference to FIG. 1.

In a system practiced on multiple computer systems, each computer system may be configured to perform a specific function for the system. For example, in one embodiment of the present invention, system 201 is a database server that stores color and product information in one or more databases (e.g., database 202). Further, system 201 performs associated functions with the color and product information, such as, for example, search and update functions.

System 201 may include a server process (e.g., process 205) that responds to requests from one or more client programs. Process 205 may include, for example, a structured query language (SQL) server or other server-based process that interfaces to one or more client programs distributed among the other systems (e.g., systems 207A-207D).

In some implementations, other computer systems, in addition to system 201, may also act as database servers. Such computer systems, including system 201, may be configured to execute a well-known database management program such as Microsoft's SQL server software, or an open source database manger such as PostgreSQL database manager. These database servers may be configured to respond to database access and update request from other computer systems. In some implementations, one database server may be configured as a master database server that distributes database requests to other database servers in order to maximize the speed of responding to database requests. In some implementations, the master database server may be configured to respond to database update requests and maintain an updated copy of the database on all other database servers. Each of the other database servers may be configured to respond only to database read or search requests.

Other server based processes 205 being executed by the other computer systems, may include a web server process, an XML server process, peer-to-peer process, a domain name server process, a routing server process, etc. In the case of a web server process 209, the computer system executing the process may be configured to accept incoming hypertext transfer protocol (HTTP) requests from a user of an Internet-based shopping site, for example through a web browser 212 being executed on a remote computer system 211 operated by the user.

Web browser 212 may direct requests through the Internet 213 to an edge routing device 215 associated with an Internet-based shopping site. Edge routing device 215 may direct the request to the web server 212 through the network 204. Web server process 209 may respond to the request by providing the requested information. In some instances, web server process 209 may communicate with other computer systems to respond to the request. For example, web server process 209 may receive a request that requires an SQL database query or other database query. In that instance, web server 212 may convert the received HTTP request into an SQL or other database query for an SQL or other database server. Web server 212 may transmit the SQL or other database request to the SQL or other database server and, after receiving a response from the database server, respond to the initial HTTP request.

According to one embodiment, a program executed by one of the computer systems 207A may be capable of determining one or more colors of a product based on an image of the product. In one embodiment, such a program may include any type of application capable of communicating with the other computer systems of the system 200 through network 204 either directly or indirectly. For example, the client program may provide a color value to a database server for storage along with other product information. The computer system 207A and/or any other device configured to determine a color of a product, as discussed in more detail below, may be considered a color component 216 of an embodiment of the present invention.

According to one embodiment, a program executed by one of the computer systems 207B may be capable of accepting submission of a new product to be listed for sale. In one embodiment, such a program may include any type of application capable of communicating with the other computer systems of the system 200 through network 204 either directly or indirectly. For example, the client program may provide a representation of the product to a color component to determine a color value of the product. The client program may also provide another representation of the product to a database server for storage along with the color information. The computer system 207B and/or any other device configured to accept submission of a product, as discussed in more detail below, may be considered a submission component 217 of an embodiment of the present invention.

According to one embodiment, a program executed by one of the computer systems 207C may be capable of searching for products based on a color of the product. In one embodiment, such a program may include any type of application capable of communicating with the other computer systems of the system 200 through network 204 either directly or indirectly. For example, the client program may receive a representation of a desired color and send a request to a database server querying for products associated with colors that match the desired color. The computer system 207C and/or any other device configured to search for a product based on a desired color, as discussed below, may be considered a search component 218 of an embodiment of the present invention.

In one embodiment, one or more of the search component 218, color component 216, and/or submission component 217 may be implemented on a single computer system or multiple computer systems. In one implementation, one or more of the search component 218, color component 216, and/or submission component 217 may include a database server or other storage component.

In one embodiment, a database server may associate the color value with the product information by storing the color value with the product information or a link to the product information (e.g., as a product ID value that references a product listing in a product listing table) in one or more database tables. In such an embodiment, an Internet-based shopping site may search and update color information by querying and updating the database table entry or entries that correspond to the product information and associated color value.

Example Processes

In one aspect of the present invention, an Internet-based shopping site may be configured to determine a color of a product listed for sale with the site. The color may be represented by a color value determined, for example, by a process similar to one of the processes illustrated in FIGS. 3 and 5. However, it should be recognized that any process may be used to determine a color value of a product from information submitted to the site regarding the product.

In one embodiment of the present invention, the color value may be determined by examining an image submitted to an Internet-based shopping site. For instance, an image may be submitted at the time the product was first listed for sale with an Internet-based shopping site in a process described in more detail below. In one example implementation, a color value determined from the submitted image may be associated with the product, and used to search through the products listed with an Internet-based shopping site. In another embodiment, the color value may be determined by a representation of the color, such as color name or color value, submitted with the product by the seller. It should be appreciated that a color value may be determined using one or more methods, including, but not limited to, analyzing a submitted image, accepting color information for the seller, and permitting the seller to select a portion of a submitted image a representative color.

Figure 3:
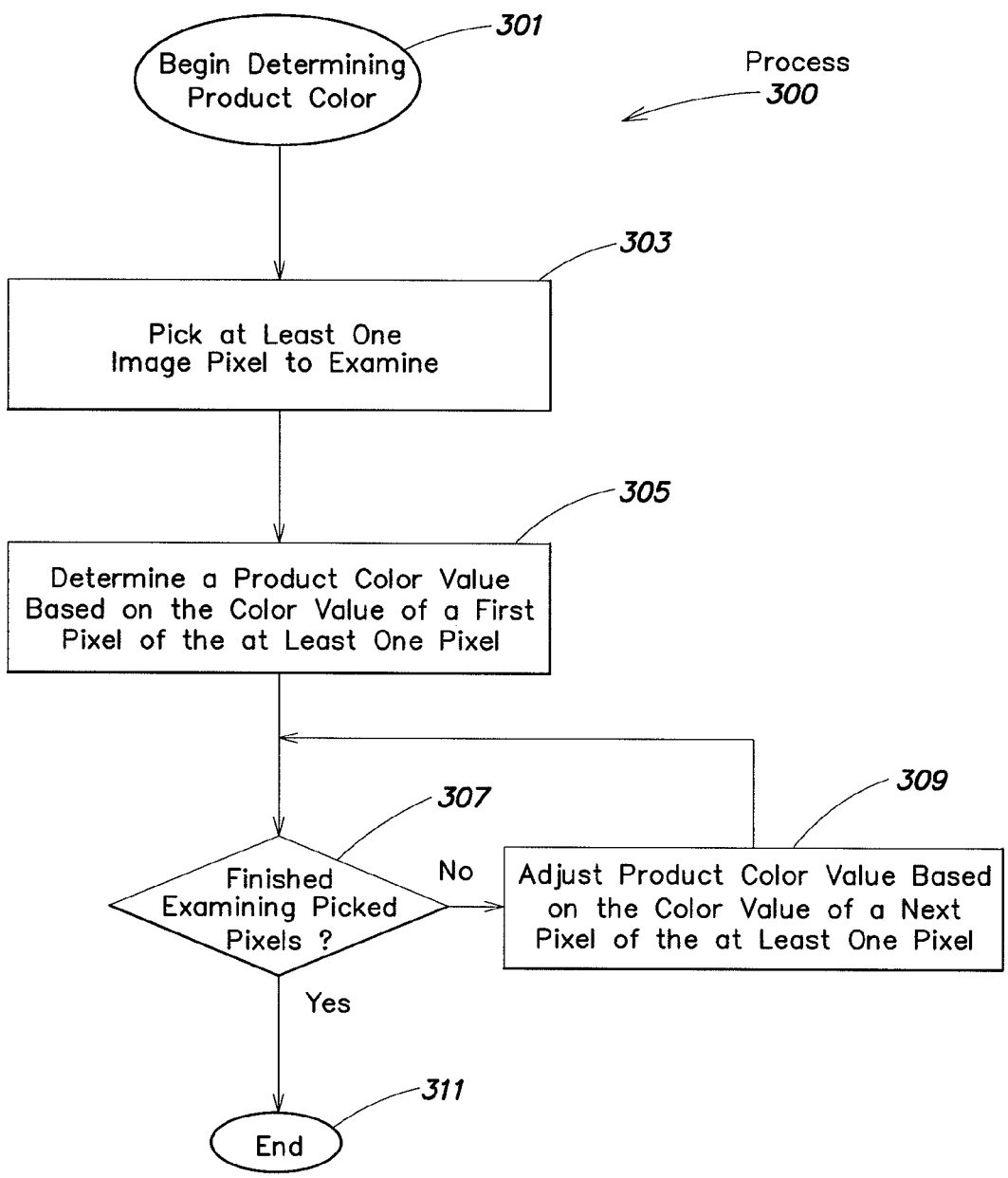
FIG. 3 shows an example process for determining a color from an image of a product according to one embodiment of the present invention.

FIG. 3 illustrates an example process 300 that may be used in some embodiments of the present invention to determine a single color value for a product from an image of the product. Process 300 may provide automatic and accurate color values that approximate a color of the product and may later be used to search for the product by color. Computer systems, computer components, or other devices performing a color determination process (e.g., 300) may be called a color component.

Process 300 may begin at block 301. In one embodiment, as indicated in block 303 of FIG. 3, an Internet-based shopping site may first pick at least one image pixel of the image to examine.

One embodiment of the present invention may choose pixels to emphasize a product or focal region of an image (i.e., an important portion of an image such as, for example, a portion in which the product is disposed) and to deemphasize a periphery or background region of the image (i.e., a portion of an image that is unimportant such as, for example, a portion displaying a background or user of the product). Such embodiments may emphasize the focal region and deemphasize the periphery region so that the color value may more accurately represents the color of the product rather than a background of the image or other element of the image.

Figure 4B:
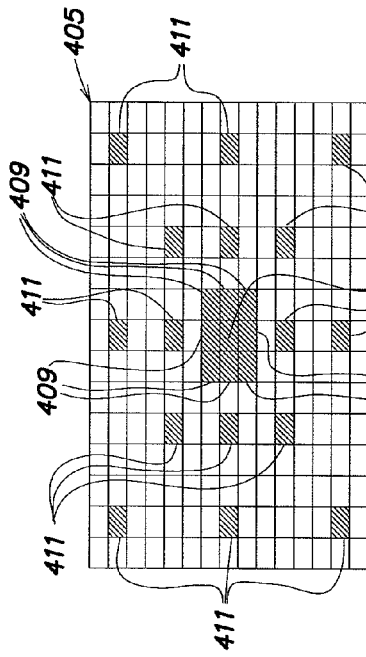
FIGS. 4A-4D show example patterns of chosen pixels in accordance with some embodiments of the present invention.
Figure 4A:
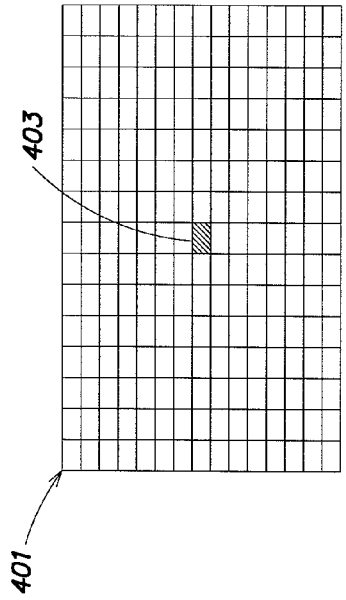

In one aspect of the present invention, it is appreciated that a product may be more likely to be placed in a region near or at the center of an image rather than near or at an edge of the image. In one embodiment, the focal region may include an area near the center of the image and the periphery region may include an area near the edge. To emphasize the focal region in embodiments where only a single image pixel is chosen, the image pixel may be chosen at or near the focal region of the image. FIG. 4A illustrates an image 401 divided into pixels. Pixel 403 may be the pixel chosen to be examined in an embodiment of the present invention that chooses only one pixel in or near the focal region of an image.

To emphasize the focal region in embodiments where multiple image pixels are chosen, the multiple image pixels may be focused at or near the focal region of the image. FIG. 4B illustrates an image 405 with a focal region at the center of the image. Chosen pixels 407, 409, and 411 are focused at the center of the image 405. In one implementation, as illustrated in FIG. 4B, image pixels may be chosen in a Fibonacci-based pattern of image pixels centered at the focal region. In such an implementation, the center pixel 407 of the focal region and its neighboring pixels 409 may be chosen to begin the Fibonacci sequence. Then, other pixels may be chosen so that each F(n)th pixel 411 radiating away from the center pixel is chosen, where $F(n)=F(n-1)+F(n-2)$, $F(0)=1$ (corresponding to the center pixel 407), and $F(1)=1$ (corresponding to pixels 409 neighboring the center pixel 407).

In one embodiment, a user of an Internet-based shopping site may choose a focal region of the image. By allowing the user to choose the focal region, the site may more accurately determine a color of a product positioned away from the center or some other default focal region of the image. In one implementation, a site administrator or seller associated with the product may indicate to the site that an image focal region should not be the center of an image, but rather should be an area of the image in which the product is located. The area may be near the edge, near the center, or anywhere else in image. Any focal region based pixel choosing techniques may then be based upon the chosen focal region rather than the image center. The focal region itself may include a single pixel or multiple pixels.

In one aspect of the present invention, it is appreciated that images of products may commonly include a background which is relatively light or relatively dark compared to the product, image pixels may be chosen to avoid some dark and/or some light image pixels. By doing so, the color determination may more accurately reflect the color of the product rather than the background of the image.

In one embodiment, a darkest percentage and/or a lightest percentage of pixels may be avoided when choosing image pixels. In one implementation, darkness of each image pixel may be determined based on a saturation color component (e.g., S of the HSV color space) of the pixel. In one implementation, lightness of each image pixel may be determined based on a brightness color component (e.g., V of the HSV color space) of the pixel. In another implementation, lightness may be determined based on a lightness color component (e.g., L of the HSL color space) of the pixel. In one implementation, the lightest 5% of the image pixels and the darkest 5% of the image pixels may be avoided when choosing image pixels. It should be appreciated that the above implementations are described as examples only and that in embodiments that avoid darkest and/or lightest pixels, any method of determining darkness and/or lightness of a pixel may be used and any number or percentage of pixels may be avoided.

In one embodiment, the at least one pixel may be a single pixel. The single pixel may be chosen from any location in the image, for example, the pixel may be chosen near or at a center or edge of the image. As discussed above, in one embodiment, the pixel may be chosen from a focal region of the image to better represent the color of the product instead of the color of the background. Choosing only a single image pixel may improve the speed of determining the color of the product by requiring only processing of one image pixel instead of multiple image pixels. However, choosing only a single image pixel may result in a less accurate determination of the color of the product than other processes that examine multiple image pixels, as discussed below.

In one embodiment, the at least one pixel may include multiple pixels. In one embodiment, the pixels may include every pixel of the image. In some implementations, the pixels may include every pixel of the image except for those avoided based on their brightness or darkness as discussed above. Embodiments that examine every image pixel may produce a more accurate color determination than the single pixel process described above. However, such implementations may require additional time and processing power to determine the color based on a large number of pixels that may make up an image.

Figure 4D:
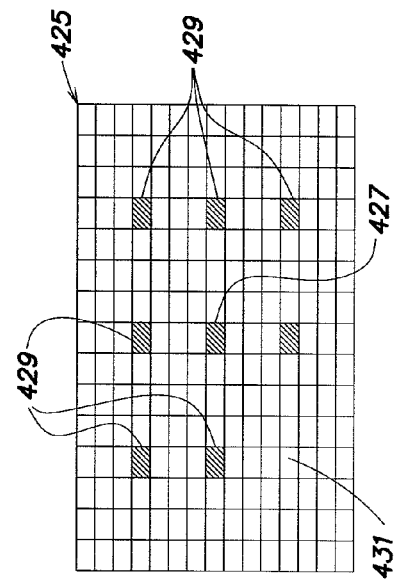
Figure 4C:
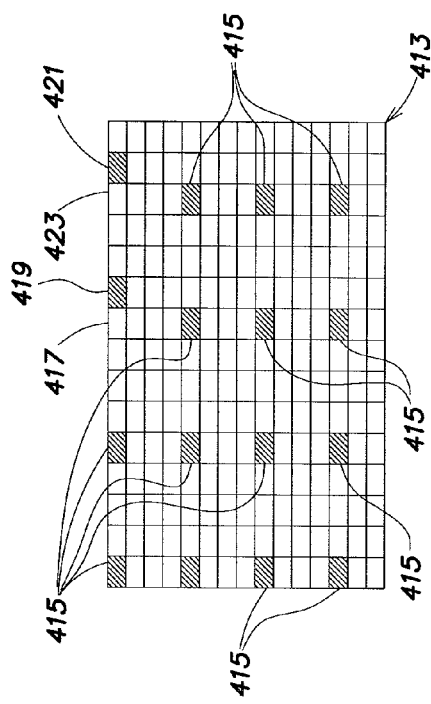

In one embodiment, the pixels may include a subset of the total pixels of the image. In one embodiment, the subset of pixels may be chosen, as discussed above based on a focal region based Fibonacci sequence. In another embodiment, image pixels may be chosen in a grid pattern approximately evenly distributed about the image. The grid pattern may, for example, choose every Nth horizontal and vertical pixel, beginning with a top left most pixel as illustrated in FIG. 4C. In FIG. 4C, every fourth pixel 415 of image 413 may be chosen for examination. In one implementation, the value of N may be determined by a site administrator. In other embodiments, the grid may begin at a pixel near or in the focal region of the image, and/or be limited to pixels near or in the focal region of the image. In FIG. 4D, a grid of every fourth pixel of image 425 begins from center pixel 427 and includes other fourth pixels 429.

As described above, one embodiment of the present invention may choose pixels to avoid some bright and dark pixels. In one embodiment, such pixels are avoided by not picking such pixels that would otherwise have been picked based on their position within the image. In one implementation, a next neighboring pixel that is not too bright or too dark may be chosen instead of the dark or bright pixel if the dark or bright pixel would be chosen based on its position. In such an implementation, the choosing pattern may begin again at the chosen neighboring pixel (e.g., the Nth pixel away from the neighboring pixel may be chosen instead of the Nth pixel away from the dark or bright pixel). For example, pixel 417 of FIG. 4C, which would otherwise be chosen as a fourth pixel in a grid pattern discussed above, may be too bright to be chosen from image 413; instead, pixel 419 may be chosen as a replacement pixel and the pattern may start again from pixel 419 so that pixel 421 is chosen rather than pixel 423. In another implementation, no pixel may be chosen to replace the dark or bright pixel and the pixel choosing may continue along its established pattern without the dark or bright pixel being chosen. For example, pixel 431 of FIG. 4D, which would otherwise be chosen as a fourth pixel in a grid pattern as discussed above, may be too dark to be chosen in image 425 and no pixel may chosen as a replacement.

In one embodiment, after the at least one image pixel is chosen, an Internet-based shopping site may examine a first pixel of the at least one pixel and determine a current color value based on the first pixel as indicated in block 305 of FIG. 3. In one embodiment, the color value may be the same or substantially the same as the color value of the first pixel.

As indicated in block 307, an Internet-based shopping site may then determine if all chosen pixels have been examined, such as if only one pixel was chosen. If all chosen pixels have been examined, then process 300 may finish at block 311 with the current color being the color that may be associated with the product (i.e., the determined color). If there are chosen pixels that have not yet been examined, process 300 may continue.

As indicated in block 309, if there are additional pixels to examine, one embodiment of an Internet-based shopping site may examine a next pixel of the chosen pixels and adjust the current color based on the color value of the next pixel. The current color may be adjusted, for example, by averaging the color value of the next pixel with the color value of other chosen pixels previously examined process 300. Some implementations may weigh each image pixel evenly when adjusting the current color value. Other implementations may weigh pixels more heavily based on their proximity to the focal region when adjusting the current color value.

After examining the next pixel, process 300 may loop to block 307, as indicated in FIG. 3 so that each pixel is examined and the current color value is adjusted to reflect each chosen pixel. Once every pixel has been examined, the adjusted current color value may be the determined color that may be associated with the product. The process 300 may finish at block 311.

A substantially similar process as just described may be used in some implementations to determine a brightness of a black and white or predominantly black and white image. A black and white image may include an image having a large number of unsaturated pixels (i.e., pixels having a saturation (S of the HSV color model) near 0). In some implementations, an image may be considered black and white if the color determined by the above described process has a saturation value below a threshold saturation value. In one implementation, the threshold saturation value may be determined by a site administrator. In one implementation, the threshold saturation value may be 5%. In some implementations, the black and white color may be the color determined by the process described above. In other implementations, the black and white color may be determined by determining the color again with different pixel choosing parameters. For example, in one implementation, the pixels chosen to determine a black and white color may not avoid the brightest or darkest pixels of the image because such pixels may be less likely to be part of a background when the entire image is unsaturated.

In one embodiment, black and white images may be treated differently by a color based search tool, as described below. To facilitate black and white searching as well as color searching, when an image is determined to be a black and white image, the information stored with the product may include a black and white flag indicating the product's black and white status as well as a color value of the black and white color. In general, brightness may be the most descriptive color component describing a black and white image, and in one implementation may be included in the color value associated with the black and white product.

Figure 5:
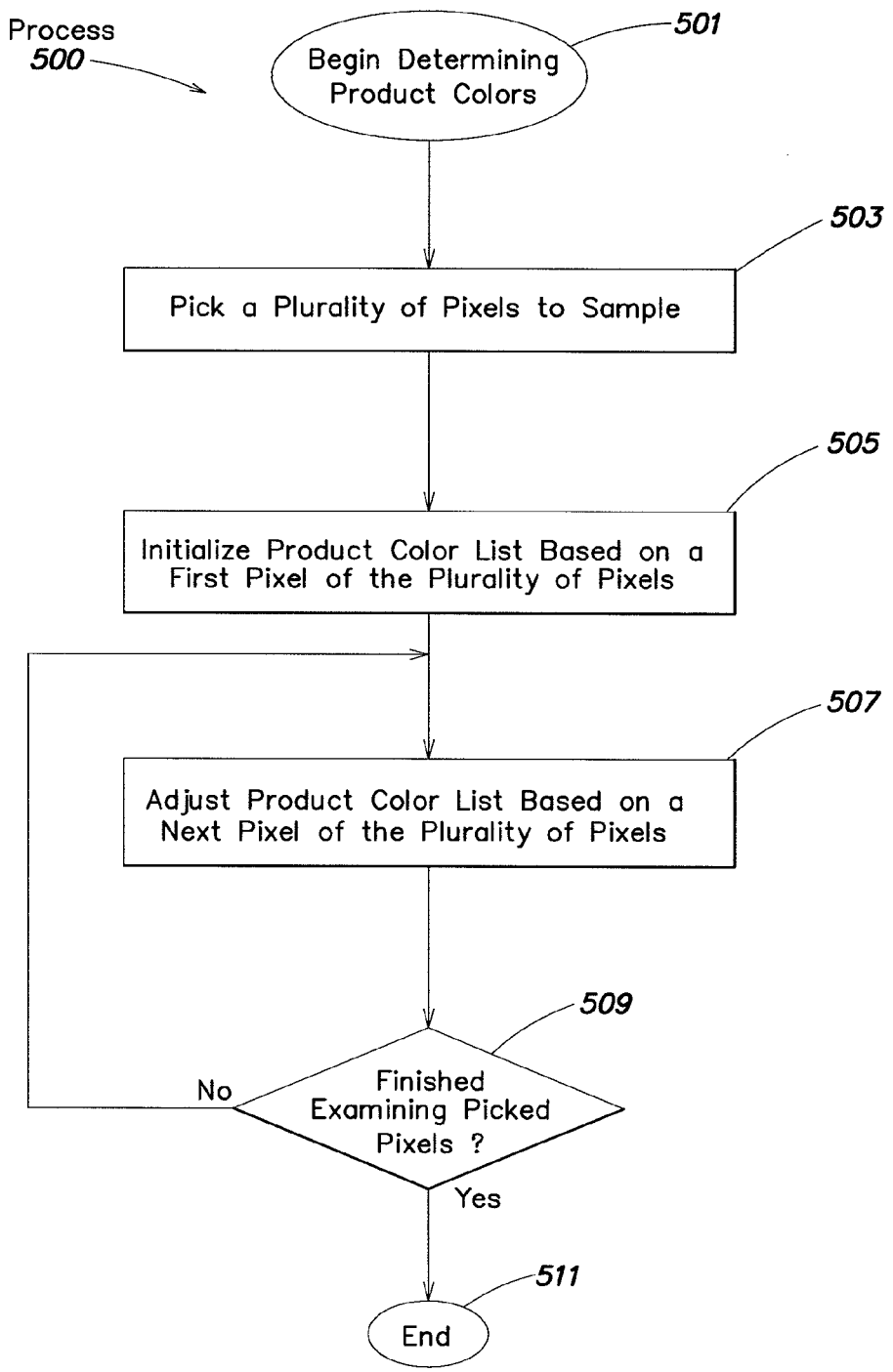
FIG. 5 shows an example process for determining colors of a product from an image of the product according to one embodiment of the present invention.

FIG. 5 illustrates an example process 500 that may be used in one embodiment of the present invention to determine multiple color values for a product. Process 500 may be performed by, for example, one or more general purpose computer systems executing one or more computer programs, as described above, that make up a color component of an Internet-based shopping site. Process 500 may be useful when a product has more than one significant color portion.

Process 500 may begin at block 501. In one embodiment, as indicated in block 503 of FIG. 5, an Internet-based shopping site may pick multiple image pixels to examine from an image associated with the product.

The pixels may be chosen in a substantially similar manner as is described above with respect to choosing pixels associated with process 300 of FIG. 3. For example, every pixel may be chosen, or a subset of the pixels may be chosen in a focal region based fashion and/or a grid fashion. Furthermore, brightest and darkest pixels may be avoided in choosing pixels, as discussed above.

After choosing the pixels to examine, a first pixel of the chosen pixels may be examined and a color value list may be initialized based on the first pixel, as indicated in block 505 of FIG. 5. In some implementations, the first pixel may be a top left most pixel. In other implementations, the first pixel may be chosen so that it is a pixel in the focal region. By choosing the first pixel in the focal region, the color list may be initialized with a color that may more accurately represent a prominent product color rather than a background color or a secondary product color.

The color list may include a listing of color values within the image. The color list may begin as an empty list and be populated during process 500. When the first pixel is examined, the color value of the first pixel may be added to the color list and a color weight may be associated with the color value. In some implementations, the color value of the first pixel may be a color value of the first pixel. In some implementations, the color weight may be a number that indicates a number of pixels associated with that color value (e.g., 1 in the case of the first pixel). In some implementations, the weight may be adjusted based on the proximity of the pixel to the focal region of the image such that pixels closer to or in the image focal region are weighted more heavily than pixels further from or out of the image focal region.

As indicated in block 507, in one embodiment, the color list may be adjusted based on a next pixel of the chosen pixels. In one implementation, the next pixel may be the pixel coming next in a left to right, top to bottom arrangement of pixels. In another implementation, the next pixel may be a next closest pixel to the focal region of the image.

In one embodiment, a color value of the next pixel may be added to the color list if the color value of the next pixel is not near any other color value in the color list. The nearness of one color value to another color value may be based on one or more color components of each color. For example, an RGB color value of 200, 125, 75 may be nearer an RGB color value of 200, 100, 75 than an RGB color value of 200, 0, 75.

In another example, the distance between one color and another color that constitutes near may be statically determined by a site administrator. In yet another example, the distance may be dynamic based on the color range of the chosen pixels. For example, if the chosen pixels span a large range of colors, a larger color distance may constitute near. A larger distance may be used for images having chosen pixels that span a large color distance because the resolution needed to separate colors of the product may be less. In another example, if the chosen pixels span a smaller range of colors, a smaller color distance constitutes near. A smaller distance may be used for images having chosen pixels that span a small color range because the color resolution needed to separate colors of the product may be greater.

In one embodiment, a color distance may be indicated by one or more distance values. In one embodiment, distance values may indicate distances for each color component of the color value. For example, a color distance may be indicated separately by a triplet of 10, 10, 10 indicating a distance of 10 for each of a red, green, and blue color component. In one embodiment, a color distance may be indicated by a single scalar color value determined by an equation such as:

$$d = \sqrt{\nabla r^2 + \nabla g^2 + \nabla b^2}, \tag{1}$$

where d is distance, $\nabla r$ is the difference between the red components of two color values, $\nabla g$ is the difference between the green components of two color values, and $\nabla b$ is the difference between the blue components of two color values. It should be recognized that color values and distances may be stored and calculated using other color components than the described red, green, and blue components.

In other embodiments, the distance calculation may give more weight to one color component than other color components. For example, in one embodiment, because humans see differences in red color components more than differences in other color components, a difference in a red color component may be weighed more heavily than a difference in another color component.

One implementation of a site configured to weigh differences in a red component more heavily than other color component differences, may calculate distance based on HSV color values that have components maintained as integer values from 1 to 256. If the average brightness (ab) of two colors (i.e., the average brightness (V of the HSV color space) of the two color values) is less than 96, the difference in hue ($\nabla h$) of the two colors (i.e., the absolute difference between hues (H of the HSV color space) of the two color values) may be multiplied by (ab/96). If ab, on the other hand, is greater than 192, $\nabla h$ may be multiplied by [(256−ab)/64]. If the average saturation (as) of the two colors (i.e., the average saturation (S of the HSV color space) of the two color values) is less than 128, $\nabla h$ may be further multiplied by (as/128). If $\nabla h$, after the appropriate multiplications just described, is greater than a threshold hue distance value, the colors may not be consider near each other. Also, if $\sqrt{\nabla b^2}$, where $\nabla b$ is the difference in brightness of the two colors (i.e., the absolute difference between brightness (V of the HSV color space) of the two color values), is greater than a threshold brightness value, the colors may also not be near considered near each other. Otherwise, the colors may be considered near one each other. In one implementation, the threshold distance value may be 20 and the threshold brightness value may be 64.

It should be appreciated that the above description of an algorithm for determining if two colors are near each other is given as an example only. Any method of determining whether two colors are near each other may be used in accordance with the present invention. For example, other methods may weigh a saturation component more heavily than other color components or may calculate color distance based on red, green, and blue color component values of the two colors instead of hue, saturation, brightness components.

In one embodiment, if the color value of the next pixel is near a color value from the color list, the weight associated with the color value in the color list may be increased to indicate that an additional pixel is associated with the color value. In one implementation, the color value in the color list may be adjusted to reflect the additional pixel. For example, the color value of the additional pixel may be averaged with other pixels previously associated with the color value. In other implementations, the color value in the list may not be adjusted when the new pixel is examined by may maintain the original color values first added to the list instead.

As indicated in block 509, in one embodiment of the present invention, process 500 may loop to examine each of the chosen pixels until all pixels have been examined and used to adjust the color list. When process 500 has finished examining all of the chosen pixels, the color list may contain a representation of the colors of the image weighted by a frequency of each color. The weight may indicate the prominence of each color within the image. In some implementations, colors below a minimum weight may be removed from the list of colors. The process 500 may finish at block 511.

It should be recognized that the processes described above or other processes for determining the color of a product based on an image of the product may be performed on a multiple images of a product. For example, in one embodiment, each image may be of a different version of the product (e.g., a red version of a shirt, a green version of the shirt, and a blue version of the shirt). In one embodiment, each image may be of the same product from different angles or in different locations, or of different portions of the product. In one implementation, a color value may be determined for each image. In one implementation, the product may be associated with each color value. In another implementation, the product may be associated with an average of the color values from each image. In another implementation, a user of the site (e.g., the site administrator or the seller of the product) may select one image on which to base the color determination.

It should also be appreciated that any method of determining a color may be used whether by examining an image associated with a product or any other information associated with the product. For example, in one implementation, a seller may indicate a color upon listing the product for sale with an Internet-based shopping site as described below. The seller in such an implementation may indicate, for example, a color value or color name of the color of the product. The site may associate the product with that color without or in addition to examining an image associated with the product.

Figure 6:
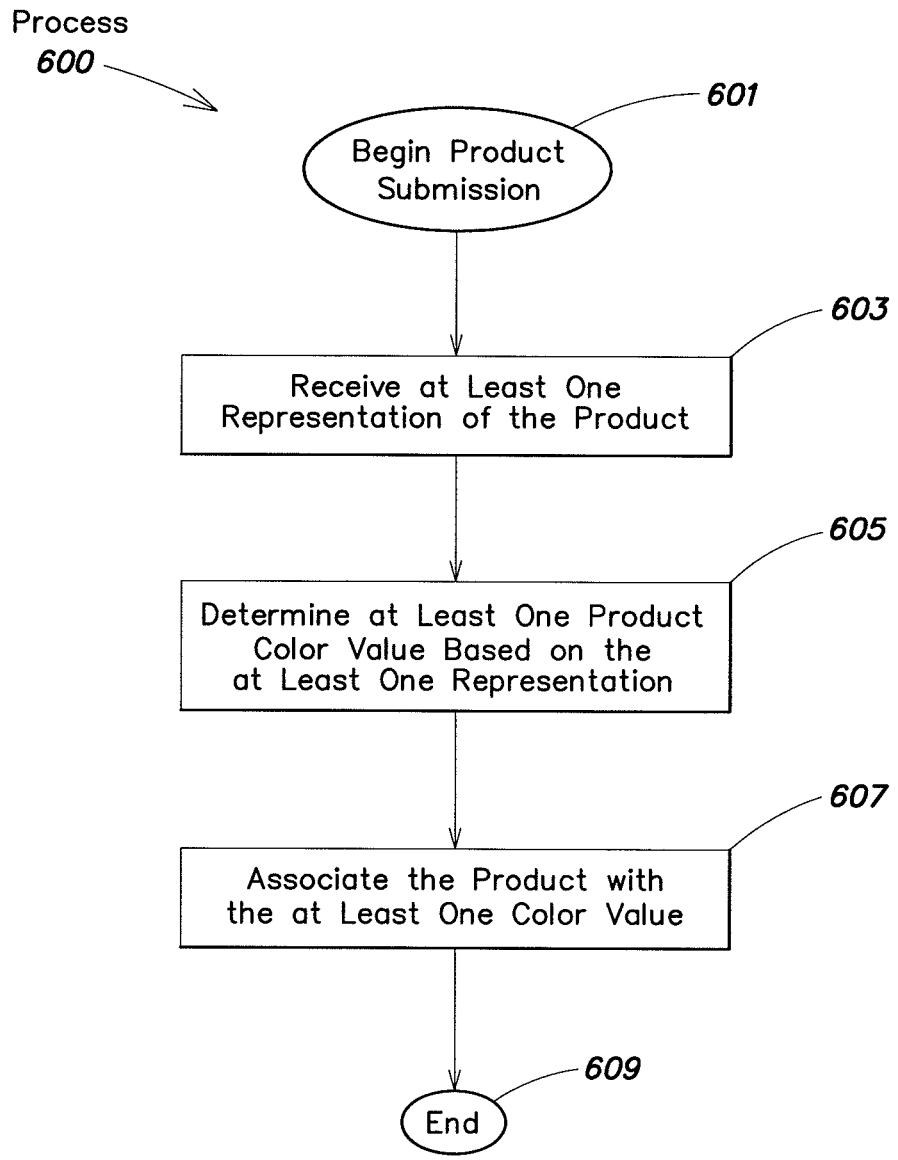
FIG. 6 shows an example process for submitting a new product according to one embodiment of the present invention.

According to one aspect of the present invention, an Internet-based shopping site may be configured to accept submission of new products for listing with the site. An example process 600 that may be performed by one embodiment of an Internet-based shopping site when a new product is submitted for listing with the site is illustrated in FIG. 6. Process 600 may being at block 601. In one embodiment, process 600 or another product submission process may be performed, for example, by a general purpose computer executing a computer program, as described above. Computer systems, computer components, or other devices performing a product submission process (e.g., 600) may be called a product submission component.

In one embodiment, to facilitate the listing of new products with the site, a submission interface may be provided to users. In one implementation, the submission interface may include a web-based interface and information regarding the product to be listed with the site may be transmitted from a web browser operated by a seller of the product by an HTTP message. In another implementation, information regarding the product may be submitted to the site by email or other messages in a predetermined product submission format.

In one embodiment, as indicated in block 603 of FIG. 6, an Internet-based shopping site may receive at least one representation of a product to be listed. In one embodiment, the representation may include one or more images of the product. In some implementations, the image may be in a Windows bitmap format (BMP), tagged image file format (TIFF), Joint Photographic Experts Group format (JPEG), graphics interchange format (GIF), or any other image file format. In some implementations, the representation may include one or more indications of a color of the product such as, for example, a color name or color value.

In one embodiment, the at least one representation may include other product information. In one embodiment, the other product information may include information related to the seller (e.g., name, address, company history, etc.), information related to the product (e.g., manufacturer name, product description, number available, etc.), and any other information related to the sale of the product.

In one embodiment, after receiving the representation, an Internet-based shopping site may determine at least one color value based on the received representation. In one embodiment, the color value may be determined by a process similar to the processes illustrated in FIGS. 3 and 5, described above.

In another embodiment, the color value may be determined from a color name or color value that may be included in the representation. For example, the components making up the color value may be included in the representation (e.g., an HTTP message). In another example, a name (e.g., red) may be included in the representation be used to reference a color value associated with the name (e.g., 255, 0, 0 in the RGB color space).

After determining at least one color value of the product, one embodiment of an Internet-based shopping site may associate the product with the at least one color, as indicated in block 607 of FIG. 6. The process 600 may then finish at block 609.

By associating the product with the color, shoppers may later search for the product based on the color. In one embodiment, the product is associated with the color value by generating a database table entry for the product and the color value. In one embodiment, the database table may also include some or all information submitted regarding the product or seller or any information related to selling the product. In some implementations, the color and other information may be stored multiple database tables.

Figure 7:
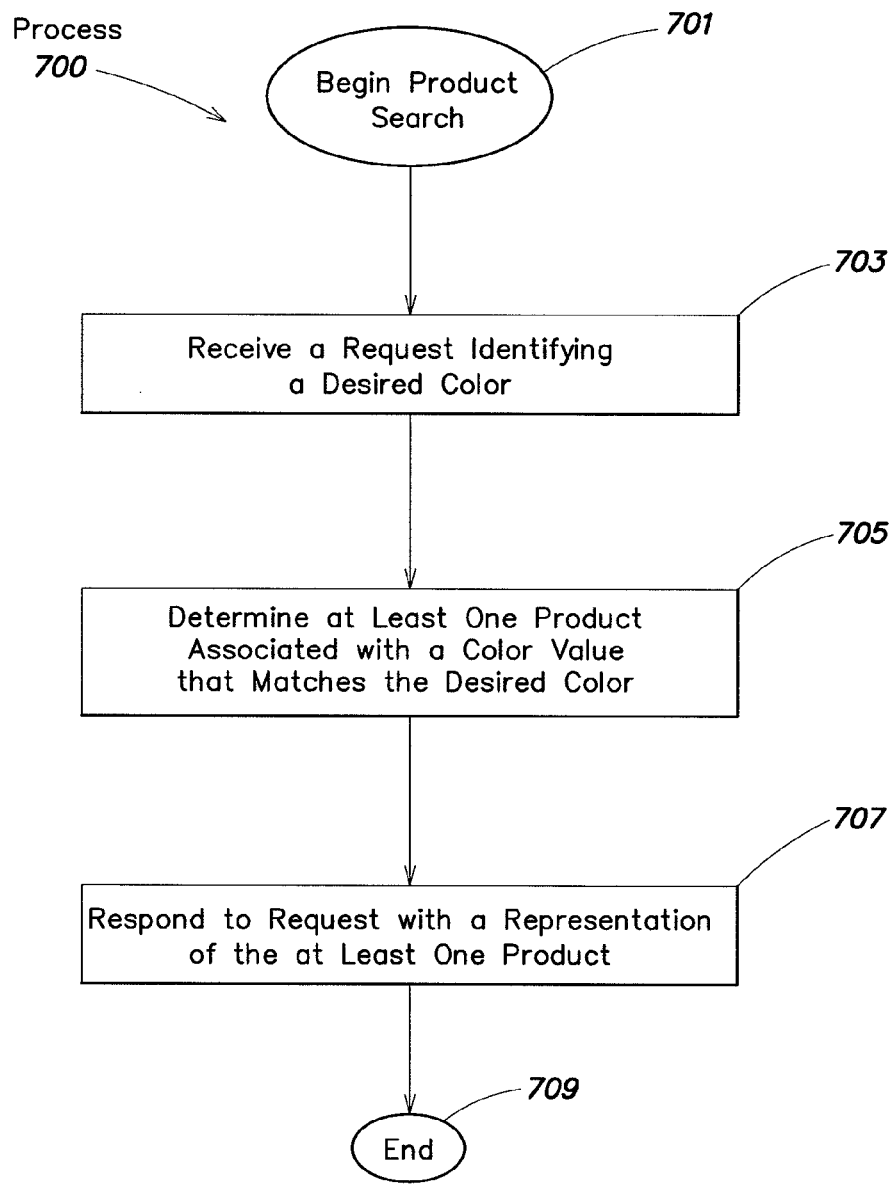
FIG. 7 shows an example process for searching for products by color according to one embodiment of the present invention.
Figure 8:
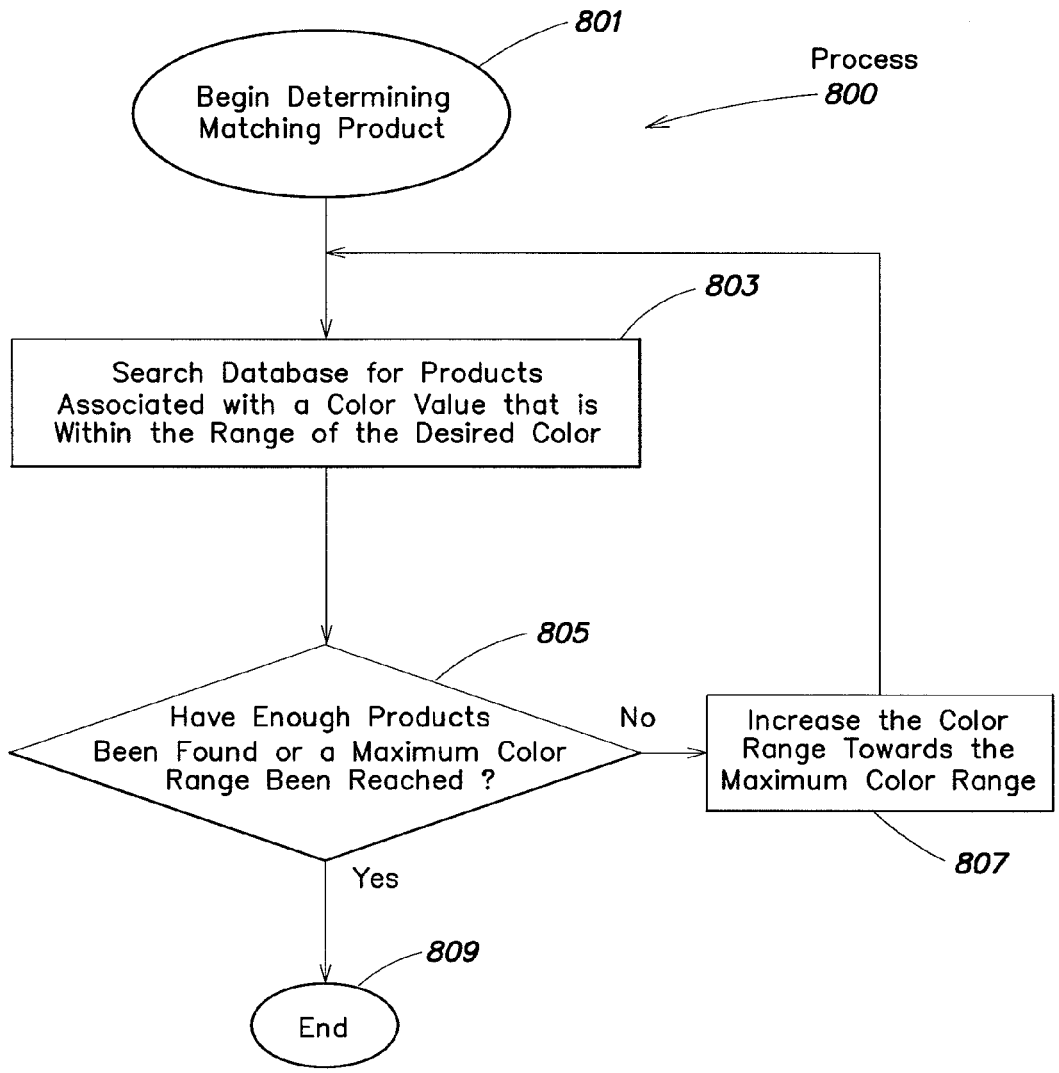
FIG. 8 shows an example process for determining products matching a desired color according to one embodiment of the present invention.

In one aspect of the present invention, an Internet-based shopping site may include a tool for shoppers to search for products based on one or more colors of the products. Such a search tool may be particularly useful for shoppers concerned with aesthetic characteristics of a product. FIGS. 7 and 8 illustrate example processes (i.e., 700 and 800) that may be used by an Internet-based shopping site to search for products based on one or more colors. The processes 700 and 800 or other color search process may be performed by one or more general purpose computers executing a computer program, as described above. Computer systems, computer components, or other devices performing a product search process (e.g., 700 and 800) may be called a search component.

Process 700 may begin at block 701 of FIG. 7. As indicated in block 703 of FIG. 7, one embodiment of a color search tool for an Internet-based shopping site may first receive a request to search for products of a desired color. In one embodiment, the request may include a representation identifying the desired color. In one implementation, the representation may include a color value or color name. In some implementations, if a shopper is searching for a black and white product having a desired brightness, the representation may include a brightness component and a black and white indicator.

As indicated in block 705, one embodiment of the present invention, after receiving a request to search for products of a desired color, may determine at least one product associated with a color value that matches the desired color. An example process 800 that may be used by some Internet-based shopping sites for determining the at least one product is illustrated in FIG. 8 and begins at block 801.

In one embodiment, as indicated in block 803 of FIG. 8, an Internet-based shopping site may first search one or more database tables used to store product and color information for any products having a color value that is within an initial color range of the desired color. If the search is for a black and white product, in some implementations, the site may limit the searched products to products flagged as black and white or products associated only with one or more colors having a saturation value less than some threshold value.

In one embodiment, the initial color range may be determined by a site administrator. The initial color range may be included in a search request identifying the desired color. A color range may identify a range of colors around the desired color that may be considered matching colors of the identified color. In one implementation, a color range may be individually identified by component ranges for each component of a desired color, such that any color having color components that are all within the component range of each of the components of the desired color may match the desired color. For example, a color having an RGB color value of 255, 1, 15, may be considered a matching color of a desired RGB color value of 255,0,0 and an RGB color range of 10, 10, 20. In another implementation, a color range may be based on a scalar value combining the differences of the components. For example, a color having an RGB color value of 255, 1, 15 may be considered a matching color of a desired RGB color value of 255, 0, 0 having a scalar color range of 20, where distance may be determined by $$d=\sqrt{\nabla r^2+\nabla g^2+\nabla b^2}. \quad (2)$$

In some implementations, one color component may be weighed more than another (e.g., red as described above with respect to determining color nearness).

In some implementations, a desired color value include less than the full number of color components used to indicate the color value in a color space. For example, a desired color value may include a hue and saturation value or a hue and brightness value, or a hue value alone. In such implementations, the unindicated components may be ignored in searching for matching products. For example, one implementation may indicate a desired color having a Hue of 215, a saturation of 50, and a color range of 10, 10. The search may match any color having a hue within the range of 205 to 225, a saturation within the range of 40 to 70, and any brightness value. In some implementations, that flag black and white images, a search may ignore such flagged images unless otherwise indicated to search for such images, by for example selecting a black and white color value from a black and white portion of a color selector, as described below.

In one embodiment, a shopper may indicate additional search parameters that may limit the search results. For example, in one embodiment, a shopper may indicate that the search should be limited to products within a category of products, products having at least a minimum amount of a desired color, products within a price range, or products manufactured by a desired company. The additional search parameters may be included in a search request received by the site. In one embodiment, an Internet-based shopping site may ignore products that would otherwise match the desired color but do not match the additional search parameters. Such additional parameters may improve the usefulness of a color search tool by allowing a shopper to further focus a search.

As indicated in block 805 of FIG. 8, in one embodiment, if a sufficient number of products have been found within the initial color range, process 800 may finish at block 809. In one implementation, the sufficient number of products may be a number determined by a site administrator. In another implementation, the sufficient number may be a number included in a search request. In one implementation, if more than the sufficient number of products is found, the products found may be trimmed to the sufficient number by eliminating some products. Products farthest away from the desired color may be eliminated before products closer to the desired color. In another implementation, all products found within the color range may be included in the search results even if the number is greater than the sufficient number.

In one embodiment, if the sufficient number of products has not been found, the color range may be increased towards a maximum color range as indicated in block 807 of FIG. 8. In one implementation, an increment by which the color range is increased may be determined by the site administrator. In one implementation, the maximum color range may be determined by the site administrator. In another implementation, the maximum color range may be included in a search request from a shopper. In other implementations, there may be no maximum number of results, rather, the search may proceed until the maximum color range is reached and all products within that range identified. In one such implementation, the initial color range may include the maximum color range. In still other implementations, there may be no maximum color range; rather, the search may continue until the sufficient number of products is identified.

In one embodiment, after increasing the color range, an Internet-based shopping site may re-search the database for additional products within the new color range. This process of searching within a color range and expanding the color range may continue until one or both of the maximum color range is reached and the sufficient number of products is found. At that point, the products that have been identified, if any, may be the products that match the desired color. The process 800 may then finish at block 809.

As indicated in block 707 of FIG. 7, in one embodiment, after the products that match the desired color have been identified, an Internet-based shopping site may respond to the search request with at least one representation of the identified products. The at least one representation may include a color value of each product, product or seller information associated with each product, a price of each product, an image of each product or any other information that may be associated with selling the product. The process 700 may then finish at block 709.

To facilitate searching products listed for sale with an Internet-based shopping site, such a site, in accordance with one aspect of the present invention, may provide shoppers with a color searching interface. Example color searching interfaces that may be used by one embodiment of the present invention are illustrated in FIGS. 9, 10, 11, 12, and 13.

Figure 9:
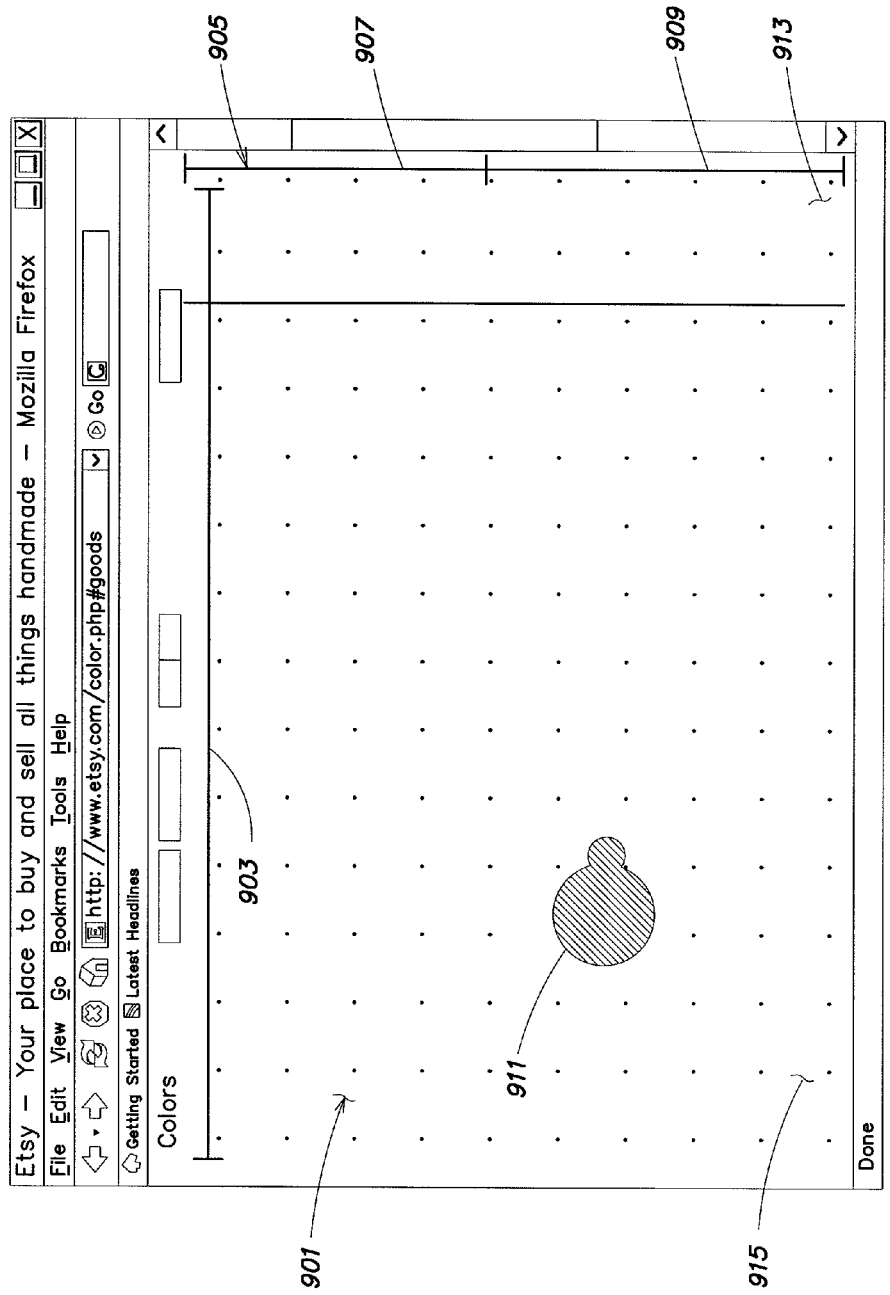
FIG. 9 shows an example interface that may be used to search for products by color.

The interface of FIG. 9 includes a color selector 901 in accordance with one embodiment of the present invention. Color selector 901 may include a flash movie file viewable with a standard web browser. Color selector 901 may be arranged in a rectangular shape, or any other one, two, or three dimensional shape. Color selector 901 may include an x-axis 903 and a y-axis 905.

In the illustrated embodiment of FIG. 9, color selector 901 may include a black and white portion 913 and a color portion 915. Black and white portion 913 may be used to select among black and white color values (e.g., how dark or bright is the product). Color portion 915 may be used to select one or more color values.

Within color portion 915, x-axis 903 may be indicative of a hue value (H of the HSV color space) so that hue changes moving from left to right along x-axis 903. The color selector 901 may be configured such that a complete range of hue values (i.e., 0 to 359 degrees) is represented along x-axis 903 of color portion 915.

Y-axis 905 of color portion 915 may be indicative of a saturation or brightness value (S or V of the HSV color space) so that at least one of hue and saturation changes as the position along y-axis 905 changes. In the illustrated embodiment of FIG. 9, y-axis 905 may be divided into a brightness portion 907 and a saturation portion 909. Brightness portion 907 of y-axis 905 may indicate a brightness component of a color value. Saturation portion 909 of y-axis 905 may indicate a saturation component of a color value. The color selector 901 may be configured such that a complete range of brightness values (i.e., 0 to 100%) is represented along the y-axis 905 brightness portion 907 of the color selector 901 and a complete range of saturation values (i.e., 0 to 100%) is represented along the y-axis 905 saturation portion 909 of the color rectangle.

A point within color selector 901, defined by an x and y value corresponding to a position along x-axis 903 and y-axis 905 within color portion 915 may indicate a color based on Hue and Saturation or Hue and Brightness. For example, a point with a y value within saturation portion 909 may indicate a color value having a saturation represented by the y value, a hue represented by the x value, and an unspecified brightness value anywhere from 0 to 100%. Similarly a point with a y value within brightness portion 907 may indicate a color value having a brightness represented by the y value, a hue represented by the x value and an unspecified saturation value from 0 to 100%.

In other embodiments, x-axis 903 and y-axis 905 may be divided in different arrangements. For example, the values represented by the position in x-axis 903 and y-axis 905 may be from the RGB, HSL, or CMYK color spaces. Additional axes, such as a z-axis in three dimensional shapes, may be used to indicate one or more color components in other implementations.

Within black and white portion 913, in the illustrated embodiment, x-axis 903 may be ignored and y-axis 905 may indicate a brightness value (i.e., V within the HSV color space). Points selected within black and white portion 913 may indicate a color having a low saturation value, any hue value, and a brightness value that is indicated by the position of the cursor along y-axis 905. In one implementation, y-axis 905 may represent a complete range of brightness values within the HSV color space In one embodiment, the color selector 901 may be resizable, for example, by resizing a web browser window. Enlarging color selector 901 may improve the resolution of the color selector 901 by increasing the distance over which the color values are distributed. In another embodiment, a shopper may be able to zoom into a section of color selector 901 to improve the resolution within a color area. Improving the resolution of a color area, either by zooming into a color area or enlarging color selector 901 may improve the accuracy of a color selection.

A shopper may use the interface of FIG. 9, in one embodiment of the present invention by, for example, moving a cursor to a desired location within color selector 901. In one implementation, a color circle (e.g., 911) may display a representation of the color corresponding to the current cursor position. When the shopper has positioned the cursor at a location corresponding to the desired color, the shopper may press a mouse button to send a representation of the color to an Internet-based shopping site by, for example, an HTTP message. In one implementation, the representation may include a position of the cursor within color selector 901. In another implementation, the representation may include at least one color component, such as, for example, a hue and saturation value or a hue and brightness value or a hue, saturation and brightness value. In some implementations, the representation may include a black and white indicator and at least one of a position within the black and white portion 913 of color selector 901 and a brightness value. It should be recognized that the representation may include any indication of a desired color value recognized by an Internet-based shopping site.

In one embodiment, as indicated above with respect to FIGS. 7 and 8, the interface may allow a shopper to indicate a maximum color range. The maximum color range may indicate how closely a shopper desires a product color to match the desired color. In one implementation, the maximum color range may be indicated by a length of a mouse click on the desired color. For example, a short mouse click may indicate a small maximum color distance. A long mouse click may indicate a large maximum color distance.

Figure 10:
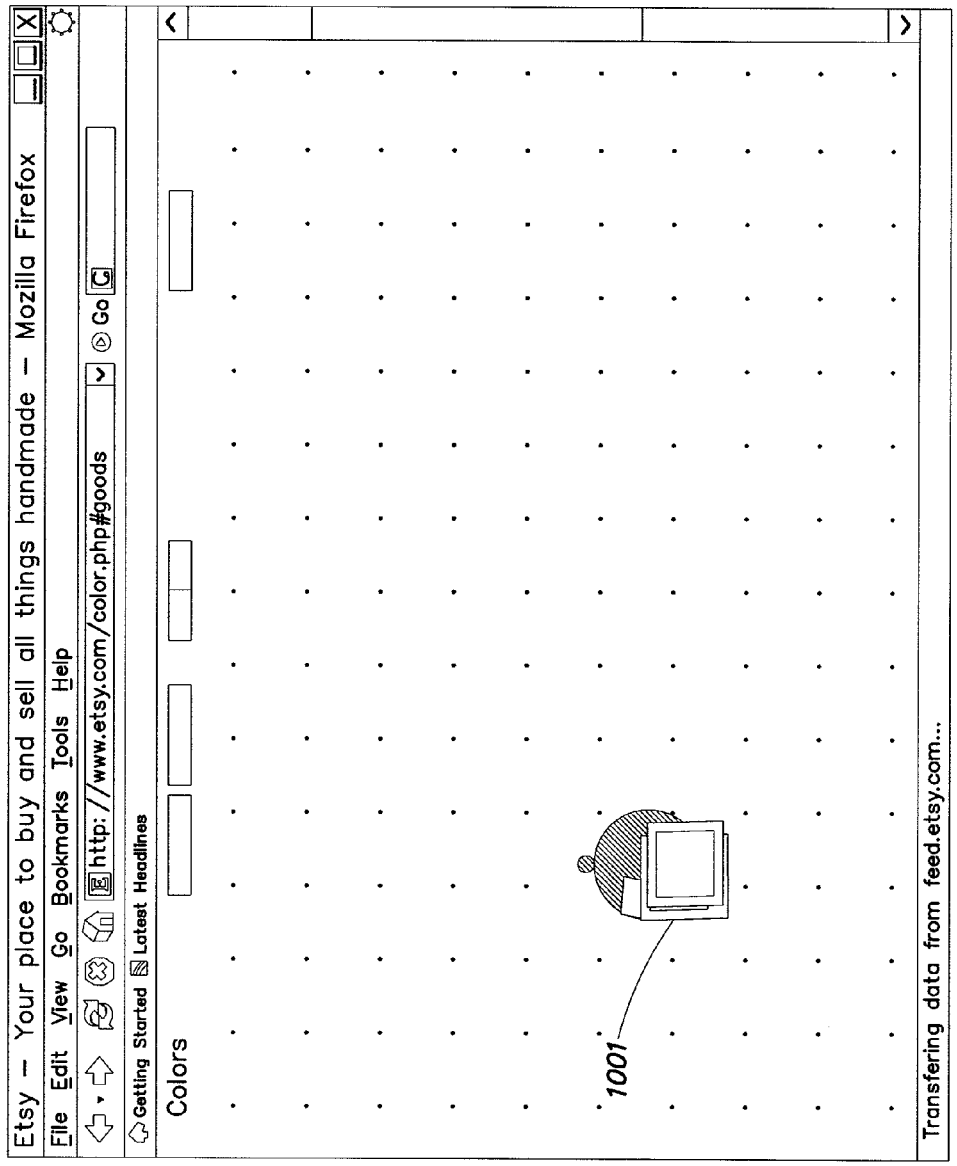
FIG. 10 shows an example interface that may be used to display products matching a desired color according to one embodiment of the present invention.

FIG. 10 illustrates an example interface through which an Internet-based shopping site may respond to a search request. The interface may include substantially similar features to the search interface described above with respect to FIG. 9. In some implementations, the shopper may be able to select an additional desired color with which to perform an additional search from the interface displaying the search results. In some instances, the result interface may include the same website as the search interface described in FIG. 9. For example, in the illustrated embodiment of FIG. 10, products matching the desired color may be displayed to the shopper within color selector 901. The products may be positioned in color selector 901 at a position corresponding to a color associated with the product. If a product is associated with more than one color or may be placed in more than one position in color selector 901, in one implementation, the product may be placed in the location closest to the desired color.

A representation of a product displayed to the shopper (e.g., 1001) may include an image of the product and other product information associated with the product. In one implementation, the shopper may request more information related to the product, by, for example, clicking on the product representation.

Figure 11:
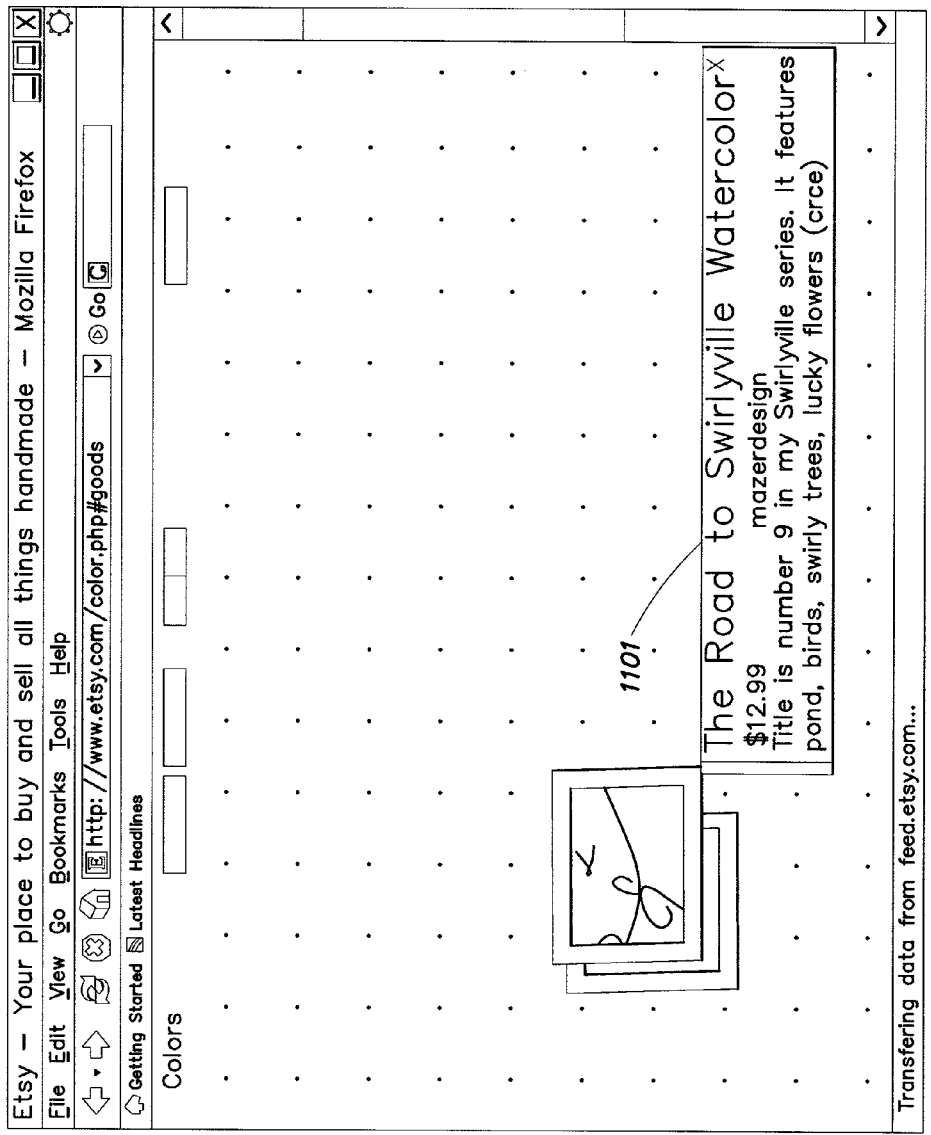
FIG. 11 shows an example interface that may be used to display products matching a desired color according to one embodiment of the present invention.

FIG. 11 illustrates an example interface in which additional information may be displayed for a product. The interface may be substantially the same interface as FIGS. 9 and 10. In one implementation, the interface may include the same website as the search interface of FIGS. 9 and 10. In one implementation, the interface may be configured to zoom into the product representation and display a product information tag 1101 that contains additional product information. If the shopper desires even more information about the product in the embodiment of FIG. 11, the shopper may click on the product representation to be directed to the interface of FIG. 14, described below. In some implementations, the shopper may be given the option to purchase the products from the interface used to search for the products, to add the product to a shopping cart for later purchase, and/or to add the products to a list of favorite products or a wish list of products. In other embodiments, the interface of FIG. 11 may be replaced with an interface dedicated to the product, similar to the interface of FIG. 14, discussed below.

Figure 12:
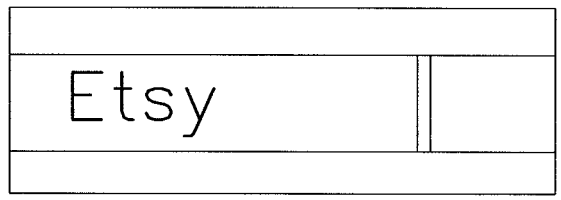
FIG. 12 shows an example interface that may be used to search for products by color.
Figure 12:
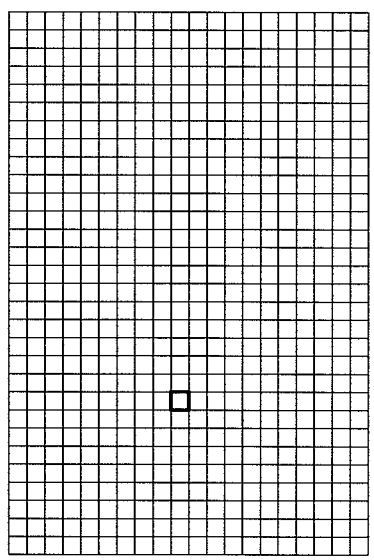

FIG. 12 illustrates an alternative color selection interface that may be used in one embodiment of the present invention. The interface of FIG. 12 may include multiple color squares. Each color square may represent a particular color value or a range of color values. The color squares of the color selector of FIG. 12 may be chosen to represent a selection of colors spanning a color space. The interface of FIG. 12 may include a color portion and a black and white portion, as discussed above with respect to FIG. 9.

In one embodiment, the colors in the color portion may be arranged so that a shopper may easily find a desired color. In one implementation, a y-axis may represent a hue, similar to the x-axis described above with respect to the interfaces of FIG. 9. In one implementation, an x-axis may represent at least one of a saturation component and a brightness component. In one implementation, one portion the x-axis may include a saturation portion and a brightness portion, as described above with respect to the interface of FIG. 9. The color squares may be arranged to correspond to the x and y values describing the square position in the interface. A shopper may select a square by clicking on the square to transmit a representation of the color or position of the square to an Internet-based shopping site.

Similarly, in one embodiment, the black and white portion may be arranged according to a brightness of a black and white image. In one embodiment, the color squares of the black and white portion may be arranged along a y-axis according to a brightness of the square. In one implementation, a shopper may select a color square within the black and white portion by clicking on the square to transmit a representation of color or position of the square to an Internet-based shopping site.

It should be appreciated that any selection interface through which a shopper may select a desired color may be used. Some alternative selection interfaces may include a color bar, a color wheel, a drop down color menu, etc.

In other embodiments of a search interface, a shopper may be able to indicate additional search parameters. Such search parameters may include a prominence of a selected color, a manufacturer of a product, a product category, a keyword, or any other parameters limiting the product search. In one implementation, the additional parameters may be selected from a drop down menu. In another implementation, the additional parameters may be entered in a text box. In one embodiment the additional parameters may include any information entered by a seller when the product was first listed with an Internet-based shopping site. In one embodiment, the additional parameters may include information entered by users other than the seller, such as reviews or ratings of the product.

FIG. 13 illustrates an alternative embodiment of a web-based interface of FIG. 10 usable to display a color search result by one embodiment of the present invention. The interface of FIG. 13 may be a separate interface from the interface used to select the desired color. The interface may display images (e.g., 1301A-J) and/or other product information (e.g., price, name, description, etc.) about products that match the desired color. The images and/or other product information may be arranged in a list. The order of the products within the list may be based on the closeness of a color to the product, or a predominance of a color within a product. In some implementations, the shopper may be given the option to purchase the products from the interface used to search for the products, to add the product to a shopping cart for later purchase, and/or to add the products to a list of favorite products or a wish list of products. In some implementations, clicking on a product in the interface of FIG. 13 may result in a more detailed products specific interface being displayed, such as the one illustrated in FIG. 14 whereby a shopper may purchase or view additional information of the product.

Figure 14:
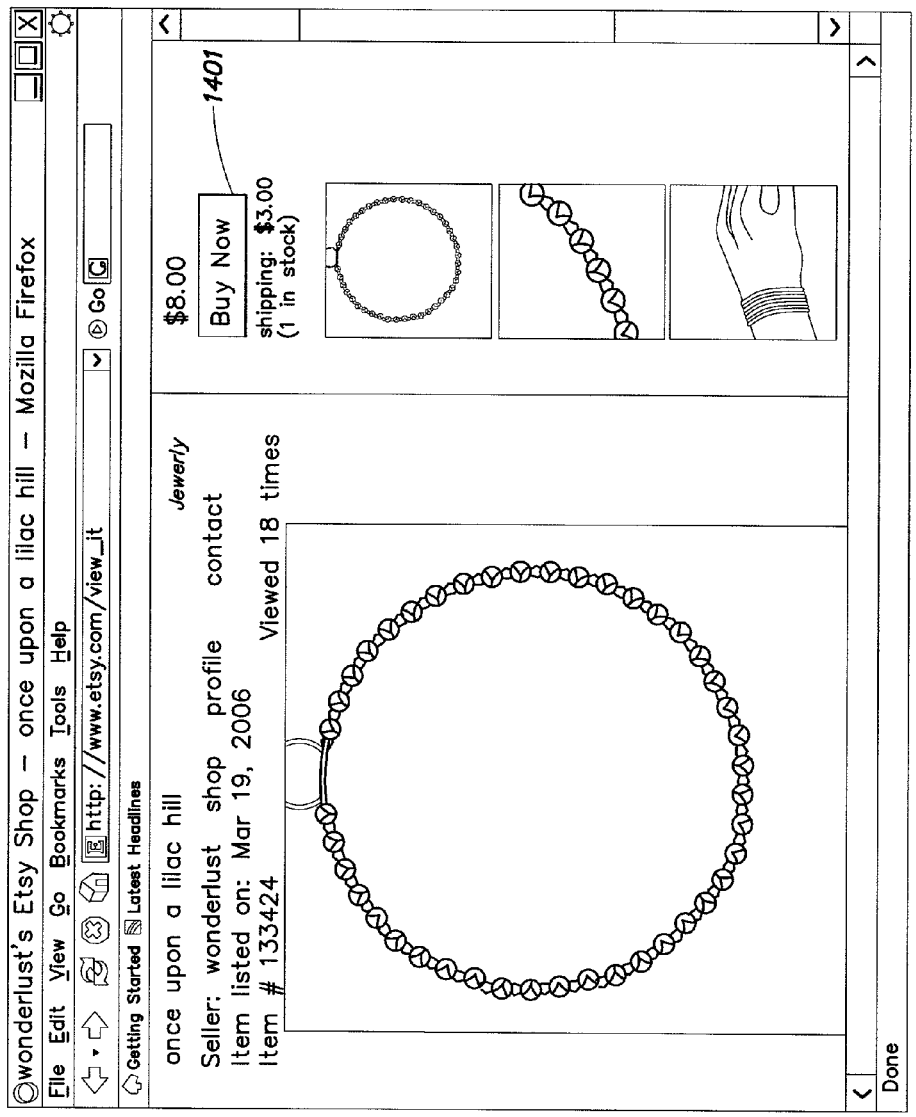
FIG. 14 shows an example interface that may be used to purchase a product according to one embodiment of the present invention.

In accordance with one aspect of the present invention, an Internet-based shopping site may allow a shopper to purchase one or more items found using a color searching tool or other searching tool. To facilitate purchasing of the product, an Internet-based shopping site may present the shopper with a product information interface that includes a product purchase option. FIG. 14 illustrates an example product information interface that may be used by one embodiment of the present invention. The interface may include detailed information regarding the product. In one implementation, the detailed information may include some or all of the product information entered by the seller when the product was first listed for sale with an Internet-based shopping site. In one implementation, the interface may include additional information added by other shoppers, such as product reviews or seller ratings. In one implementation, a shopper may indicate his or her desire to purchase a product by, for example, clicking on the "BUY NOW" button 1401. After clicking button 1401, the product may be added to a shopper's shopping cart, or the shopper may be directed to a purchasing page to enter purchasing information (e.g., billing address, shipping address, payment information, etc.).

It should be recognized that some substantially similar processes and interfaces may be used for characteristics of products other than or in addition to color in accordance with some aspects of the present invention.

In one aspect of the present invention, an Internet-based shopping site may employ similar processes and interfaces to search for products based on the time of listing of the product. In one embodiment, the site may record a time when the product was listed in a database along with other product information. Later, the database may be queried to determine the listing time of the product or all products listed within a time range.

In one embodiment, an Internet-based shopping site may include a web-based time searching interface. In one embodiment, the time searching interface may include a flash movie file accessible by a standard web browser. In one embodiment, the time searching interface may include a timeline spanning from the first product listing time to the current time or some other desired time range. In one embodiment, the time searching interface may include the timeline oriented as a three-dimensional interface displaying product representations at points along the timeline that correspond to the time each product was listed. In one embodiment, the timeline may be oriented such that the most recent time is farthest away from the shopper and the most current time is closest to the shopper. In such an embodiment, the most recent products may be viewable at first by the shopper, and the shopper may navigate through such an interface by clicking to move forward (i.e., back in time). In one implementation, the time line may be arranged as a spiral or other shape.

In one embodiment, the time searching tool may allow a shopper to enter a desired time range. An Internet-based shopping site may search the database for products associated with a listing time within the desired time range. The interface may then display the products that were listed within the desired time range.

In one embodiment, a time searching tool may be combined with other searching parameters. For example, the time searching tool may be combined with additional search parameters such as a color, manufacturer, a price, or a keyword. In one embodiment, the time searching tool may be configured to display only results that match the additional parameter.

In one aspect of the present invention, an Internet-based shopping site may employ similar processes and interfaces to search for products based on a geographic location of a seller. The site may receive the geographic location along with the product listing information. In one embodiment, the site may record the geographic location along with other product information. In another embodiment, the site may record the geographic location in a database along with other information identifying the seller of the product. The database may relate the seller with all products being sold by the seller. In one embodiment, a database may be queried to determine a geographic location of the seller of each product or all products listed by sellers within a geographic area.

In one embodiment, an Internet-based shopping site may include a web-based location searching interface. In one embodiment, the location searching interface may include a flash movie file accessible by a standard web browser. In one embodiment, the location searching interface may include a map of a geographic area. In one embodiment, a representation of a product may be positioned on the map in the geographic location with which the product is associated. A shopper may click on a product to obtain additional information regarding the product or to purchase the product.

In another embodiment, a representation of a seller may be positioned on the map in the geographic location with which the seller is associated. A shopper may click on a seller to obtain additional information regarding the seller. The additional information may include a list of products being sold b the seller.

In one embodiment, the interface may allow a shopper to indicate a geographic location and a geographic distance. The site may search the database for products or sellers associated with a geographic location within the distance of the desired location. The interface may then display products or sellers associated with a location within the distance from the desired geographic location.

In one embodiment, a location searching tool may be combined with other searching parameters. For example, the location searching tool may be combined with additional search parameters such as a color, manufacturer, a price, time, or a keyword. In one embodiment, the location searching tool may be configured to display only results that match the additional parameter such as sellers that sell products of a given manufacturer or color.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for selling a product, the method comprising acts of: receiving, by at least one computer system, at least one representation of the product, the at least one representation including at least one image of the product, the at least one image including a plurality of pixels; selecting, by the at least one computer system, a subset of pixels within the plurality of pixels, the subset of pixels being less than all of the plurality of pixels and more concentrated in at least one focal portion of the at least one image in which the product is disposed than in at least one secondary portion of the at least one image; determining, by the at least one computer system, at least one color of the product based on at least one color of the selected subset of pixels; associating, by the at least one computer system, the product with the at least one color of the product; receiving a search request from a potential buyer, the search request including the at least one color; and providing, to the potential buyer, the at least one representation of the product.

2. The method of claim 1, wherein the at least one color of the product is based, at least in part, on an average color of the subset of pixels.

3. The method of claim 1, wherein the at least one image includes at least one product portion that includes the subset of pixels, and at least one background portion that is different than the at least one product portion.

4. The method of claim 1, wherein the focal portion includes a center of the at least one image and the at least one secondary portion includes a periphery of the at least one image.

5. The method of claim 1, wherein the at least one color of the product includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value.

6. The method of claim 1, wherein the at least one representation of the product includes at least one of a description of the product, a price of the product, an availability of the product, and an identification of a seller of the product.

7. The method of claim 1, wherein the at least one representation of the product includes an indication of the at least one color of the product.

8. The method of claim 1, wherein a user submits the at least one representation of the product through at least one submission interface.

9. The method of claim 1, further comprising an act of responding to a search request, which includes at least one representation of a desired color, by transmitting at least one representation of at least one second product that is associated with a matching color of the desired color.

10. The method of claim 9, wherein the matching color is within a color range of the desired color.

11. The method of claim 10, wherein the search request includes an indication of the matching color range.

12. The method of claim 9, wherein a user submits the search request through at least one search interface.

13. The method of claim 12, wherein the at least one search interface includes at least one color selector that includes a representation of a plurality of selectable colors.

14. The method of claim 13, wherein the selectable colors are arranged in a rectangle with hue represented along a first axis and brightness and saturation represented along a second axis such that one portion of the second axis represents a range in brightness and another portion of the second axis represents a range in saturation.

15. The method of claim 13, wherein the at least one color selector includes at least one SWF file.

16. The method of claim 12, wherein the at least one search interface includes a web-based interface.

17. The method of claim 9, further comprising an act of receiving at least one purchase request that includes at least one representation of the at least one second product.

18. The method of claim 17, wherein the user submits the search request and the at least one purchase request through at least one search interface.

19. The method of claim 9, wherein the search request includes at least one additional search parameter and the act of responding to the search request comprises responding to the search request by transmitting the at least one representation of the at least one second product that is associated with the matching color of the desired color and matches the at least one additional search parameter.

20. The method of claim 19, wherein the at least one additional search parameter includes at least one of a product category, a product name, a keyword, a product price range, and a manufacturer name.

21. The method of claim 1, wherein the act of associating the product with the at least one color of the product includes storing at least a portion of the at least one representation with at the at least one color in at least one database table.

22. The method of claim 1, wherein the act of selecting the subset of pixels includes selecting pixels from the plurality of pixels using a Fibonacci sequence.

23. The method of claim 1, wherein the act of selecting the subset of pixels includes selecting pixels from the plurality of pixels using a grid pattern.

24. The method of claim 1, wherein the act of selecting the subset of pixels further includes selecting pixels within only the focal portion of the image.

25. A system for selling a product, the system comprising: at least one processor operatively connected to a memory, wherein the processor is configured to execute system components stored in the memory, the system components comprising: a submission component configured to accept submission of at least one representation of the product and associate the product with at least one first color, the at least one representation including at least one image of the product, the at least one image including a plurality of pixels; a search component configured to select a subset of pixels within the plurality of pixels, the subset of pixels being less than all of the plurality of pixels and more concentrated in at least one focal portion of the at least one image in which the product is disposed than in at least one secondary portion of the at least one image, and determine at least one color of the selected subset of pixels; a color component configured to determine the at least one first color based, at least in part, on the at least one color of the selected subset of pixels; a request component configured to receive a search request from a potential buyer, the search request including the at least one color; and a product component configured to provide, to the potential buyer, the at least one representation of the product.

26. The system of claim 25, wherein the at least one first color of the product is based, at least in part, on an average color of the subset of pixels.

27. The system of claim 25, wherein the at least one image includes at least one product portion that includes the subset of pixels, and at least one background portion that is different than the at least one product portion.

28. The system of claim 25, wherein the focal portion includes a center of the at least one image and the at least one secondary portion includes a periphery of the at least one image.

29. The system of claim 25, wherein the at least one first color includes at least one of a Red, Green, Blue (RGB) value; a Hue, Saturation, Brightness (HSV) value; a Hue, Saturation, Lightness (HSL) value; and a Cyan, Magenta, Yellow, Key (CMYK) value.

30. The system of claim 25, wherein the at least one representation of the product includes at least one of a description of the product, a price of the product, an availability of the product, and an identification of a seller of the product.

31. The system of claim 25, wherein the at least one representation of the product includes an indication of the at least one first color of the product.

32. The system of claim 25, wherein a user submits the at least one representation of the product to the submission component through at least one submission interface.

33. The system of claim 25, wherein the search component is further configured to respond to a search request, which includes at least one representation of a desired color, by transmitting at least one representation of at least one second product that is associated with a matching color of the desired color.

34. The system of claim 33, wherein the matching color is within a color range of the desired color.

35. The system of claim 34, wherein the search request includes an indication of the matching color range.

36. The system of claim 33, wherein a user submits the search request to the search component through at least one search interface.

37. The system of claim 36, wherein the at least one search interface includes at least one color selector that includes a representation of a plurality of selectable colors.

38. The system of claim 37, wherein the selectable colors are arranged in a rectangle with hue represented along a first axis and brightness and saturation represented along a second axis such that one portion of the second axis represents a range in brightness and another portion of the second axis represents a range in saturation.

39. The system of claim 37, wherein the at least one color selector includes at least one SWF file.

40. The system of claim 36, wherein the at least one search interface includes a web-based interface.

41. The system of claim 33, wherein the search request includes at least one additional search parameter, and wherein the search component is further configured to respond to the search request by transmitting the at least one representation of the at least one second product that is associated with the matching color of the desired color and matches the at least one additional search parameter.

42. The system of claim 41, wherein the at least one additional search parameter includes at least one of a product category, a product name, a keyword, a product price range, and a manufacturer name.

43. The system of claim 25, wherein the system components further comprise at least one storage component configured to store at least a portion of the at least one representation and the at least one first color in at least one database.

44. The system of claim 25, wherein the search component is further configured to select pixels from the plurality of pixels using a Fibonacci sequence.

45. The system of claim 25, wherein the search component is further configured to select pixels from the plurality of pixels using a grid pattern.

46. The system of claim 25, wherein the search component is further configured to select pixels within only the focal portion of the image.

* * * * *